US007229558B2

(12) United States Patent
Heikkilä et al.

(10) Patent No.: US 7,229,558 B2
(45) Date of Patent: *Jun. 12, 2007

(54) CHROMATOGRAPHIC SEPARATION METHOD

(75) Inventors: Heikki Heikkilä, Espoo (FI); Jari Lewandowski, Siuntio (FI); Jarmo Kuisma, Lohja as. (FI)

(73) Assignee: Danisco Sweeteners Oy, Espoo (FI)

( * ) Notice: Subject to any disclaimer, the term of this patent is extended or adjusted under 35 U.S.C. 154(b) by 334 days.

This patent is subject to a terminal disclaimer.

(21) Appl. No.: 11/032,890

(22) Filed: Jan. 11, 2005

(65) Prior Publication Data

US 2005/0115904 A1  Jun. 2, 2005

Related U.S. Application Data

(63) Continuation of application No. 10/143,188, filed on May 9, 2002, now Pat. No. 6,896,811.

(30) Foreign Application Priority Data

May 9, 2001 (FI) .................................. 20010977

(51) Int. Cl.
B01D 15/08 (2006.01)
(52) U.S. Cl. .................. 210/659; 210/198.2; 127/46.2; 127/46.3
(58) Field of Classification Search ........... 210/635, 210/656, 659, 198.2; 127/46.2, 46.3, 55
See application file for complete search history.

(56) References Cited

U.S. PATENT DOCUMENTS

| | | | |
|---|---|---|---|
| 2,007,971 A | 7/1935 | Jackson | 127/58 |
| 2,375,165 A | 5/1945 | Nees et al. | 260/534 |
| 2,519,573 A | 8/1950 | Hoglan | 260/501 |
| 2,524,414 A | 10/1950 | Wolfrom et al. | 127/55 |
| 2,586,295 A | 2/1952 | Brown et al. | 260/501 |
| 2,588,449 A | 3/1952 | Young et al. | 127/30 |
| 2,684,331 A | 7/1954 | Bauman | 210/24 |
| 2,818,851 A | 1/1958 | Khym et al. | 127/55 |
| 2,845,136 A | 7/1958 | Robinson | 183/2 |
| 2,868,677 A | 1/1959 | Kopke | 127/46 |
| 2,890,972 A | 6/1959 | Wheaton | 127/46 |
| 2,911,362 A | 11/1959 | Wheaton | 210/31 |
| 2,949,389 A | 8/1960 | Murtaugh et al. | 127/36 |
| 2,985,589 A | 5/1961 | Broughton et al. | 210/34 |
| 3,021,374 A | 2/1962 | Radzitzky | 260/631 |
| 3,044,904 A | 7/1962 | Serbia | 127/46 |
| 3,044,906 A | 7/1962 | Lefevre | 127/46 |
| 3,134,814 A | 5/1964 | Sargent et al. | 260/583 |
| 3,174,876 A | 3/1965 | Stark | 127/46 |
| 3,214,293 A | 10/1965 | Mountfort | 127/9 |
| 3,230,167 A | 1/1966 | Golay | 210/31 |
| 3,250,058 A | 5/1966 | Baddour et al. | 55/67 |
| 3,268,605 A | 8/1966 | Boyd | 260/666 |
| 3,298,527 A | 1/1967 | Wright | 210/198 |
| 3,305,395 A | 2/1967 | Scallet et al. | 127/30 |
| 3,374,606 A | 3/1968 | Baddour | 55/67 |
| 3,398,512 A | 8/1968 | Perkins et al. | 55/386 |
| 3,407,574 A | 10/1968 | Perkins et al. | 55/386 |
| 3,411,342 A | 11/1968 | Liermann | 73/53 |
| 3,416,961 A | 12/1968 | Mountfort et al. | 127/46 |
| 3,420,709 A | 1/1969 | Barrett et al. | 127/53 |
| 3,436,897 A | 4/1969 | Crowley | 55/67 |
| 3,453,811 A | 7/1969 | Crowley | 55/386 |
| 3,468,607 A | 9/1969 | Sloane et al. | 356/73 |
| 3,471,329 A | 10/1969 | Quietensky et al. | 127/46 |
| 3,474,908 A | 10/1969 | Catravas | 210/198 |
| 3,479,248 A | 11/1969 | Nobile | 162/16 |
| 3,480,665 A | 11/1969 | Nagy | 260/501.13 |
| 3,483,031 A | 12/1969 | Lauer et al. | 127/41 |
| 3,493,497 A | 2/1970 | Pretorius et al. | 210/31 |
| 3,494,103 A | 2/1970 | Mir | 55/67 |
| 3,494,104 A | 2/1970 | Royer | 55/67 |
| 3,513,023 A | 5/1970 | Kusch et al. | 127/58 |
| 3,522,172 A | 7/1970 | Pretorius et al. | 210/31 |
| 3,539,505 A | 11/1970 | Lauer et al. | 210/31 |
| 3,558,725 A | 1/1971 | Kohno et al. | 260/635 |
| 3,579,380 A | 5/1971 | Friese | 127/37 |

(Continued)

FOREIGN PATENT DOCUMENTS

CA 754511 3/1967

(Continued)

OTHER PUBLICATIONS

Abstract: French Application No. FR19890000209 filed Jan. 10, 1989, Publications No. FR2641545 published Jul. 13, 1990 of Agrocinq pertains to a Process For The Biosynthesis of Xylitol.

(Continued)

Primary Examiner—Ernest G. Therkorn
(74) Attorney, Agent, or Firm—Scully, Scott, Murphy & Presser, P.C.

(57) ABSTRACT

A method for fractionating a solution into two or more fractions. More particularly the invention relates to a method for fractionating a solution by a chromatographic simulated moving bed (SMB) process in which the dissolved substances present in the feedstock are separated in the partial packed beds, and the formed separation profile is circulated more than once or less than once through the chromatographic separation loop during one cycle.

65 Claims, No Drawings

U.S. PATENT DOCUMENTS

| | | | |
|---|---|---|---|
| 3,586,537 A | 6/1971 | Steiner et al. | 127/37 |
| 3,607,392 A | 9/1971 | Lauer et al. | 127/15 |
| 3,619,369 A | 11/1971 | Onishi et al. | 195/37 |
| 3,627,636 A | 12/1971 | Jaffe et al. | 127/37 |
| 3,632,656 A | 1/1972 | Unver | 260/635 |
| 3,692,582 A | 9/1972 | Melaja | 127/46 |
| 3,694,158 A | 9/1972 | Lauer et al. | 23/230 |
| 3,704,168 A | 11/1972 | Hara et al. | 127/58 |
| 3,706,812 A | 12/1972 | Derosset et al. | 260/674 |
| 3,730,770 A | 5/1973 | Zievers et al. | 127/46 |
| 3,732,982 A | 5/1973 | Dunnill et al. | 210/198 |
| 3,743,539 A | 7/1973 | Kroyer et al. | 127/16 |
| 3,756,855 A | 9/1973 | Duchateau et al. | 127/63 |
| 3,784,408 A | 1/1974 | Jaffe et al. | 127/37 |
| 3,796,657 A | 3/1974 | Pretorius et al. | 210/31 |
| 3,814,253 A | 6/1974 | Forsberg | 210/97 |
| 3,817,787 A | 6/1974 | Hertzen et al. | 127/46 |
| 3,826,905 A | 7/1974 | Valkama et al. | 235/151.12 |
| 3,835,043 A | 9/1974 | Geissler et al. | 210/31 |
| 3,884,714 A | 5/1975 | Schneider et al. | 127/46 |
| 3,928,062 A | 12/1975 | Yamauchi | 127/60 |
| 3,928,193 A | 12/1975 | Melaja et al. | 210/31 |
| 3,959,519 A | 5/1976 | Johnson | 426/648 |
| 3,982,003 A | 9/1976 | Mitchell et al. | 426/1 |
| 4,001,112 A | 1/1977 | Barker et al. | 210/31 |
| 4,008,285 A | 2/1977 | Melaja et al. | 260/635 |
| 4,066,711 A | 1/1978 | Melaja et al. | 260/637 |
| 4,075,406 A | 2/1978 | Melaja et al. | 536/1 |
| 4,096,036 A | 6/1978 | Liu et al. | 195/31 |
| 4,104,078 A | 8/1978 | Barker et al. | 127/46 |
| 4,143,169 A | 3/1979 | Skoch et al. | 426/307 |
| 4,145,230 A | 3/1979 | Madsen et al. | 127/60 |
| 4,157,267 A | 6/1979 | Odawara et al. | 127/46 |
| 4,182,633 A | 1/1980 | Ishikawa et al. | 127/46 |
| 4,208,284 A | 6/1980 | Pretorius et al. | 210/65 |
| 4,213,913 A | 7/1980 | de Rosset | 260/428.5 |
| 4,218,438 A | 8/1980 | Callender et al. | 424/115 |
| 4,259,186 A | 3/1981 | Boeing et al. | 210/198.2 |
| 4,267,054 A | 5/1981 | Yoritomi et al. | 210/659 |
| 4,293,346 A | 10/1981 | Landis et al. | 127/46 |
| 4,312,678 A | 1/1982 | Landis | 127/46.2 |
| 4,313,015 A | 1/1982 | Broughton | 585/828 |
| 4,332,623 A | 6/1982 | Ando et al. | 127/46.2 |
| 4,359,430 A | 11/1982 | Heikkila et al. | 260/501.13 |
| 4,366,060 A | 12/1982 | Leiser et al. | 210/635 |
| 4,368,268 A | 1/1983 | Gong | 435/161 |
| 4,379,751 A | 4/1983 | Yoritomi et al. | 210/659 |
| 4,391,649 A | 7/1983 | Shimizu et al. | 127/46.2 |
| 4,402,832 A | 9/1983 | Gerhold | 210/659 |
| 4,404,037 A | 9/1983 | Broughton | 127/55 |
| 4,405,455 A | 9/1983 | Ando et al. | 210/191 |
| 4,412,366 A | 11/1983 | Röck et al. | 16/236 |
| 4,412,866 A | 11/1983 | Schoenrock et al. | 127/46.2 |
| 4,426,232 A | 1/1984 | Neuzil et al. | 127/46.3 |
| 4,451,489 A | 5/1984 | Beale et al. | 426/254 |
| 4,461,649 A | 7/1984 | Neuzil et al. | 127/46.1 |
| 4,471,114 A | 9/1984 | Sherman et al. | 536/127 |
| 4,472,203 A | 9/1984 | Miyahara et al. | |
| 4,482,761 A | 11/1984 | Chao et al. | 568/833 |
| 4,498,991 A | 2/1985 | Oroskar | 210/659 |
| 4,518,436 A | 5/1985 | van der Poel | 127/60 |
| 4,519,845 A | 5/1985 | Ou | 127/46.2 |
| 4,533,398 A | 8/1985 | Neuzil et al. | 127/55 |
| 4,599,115 A | 7/1986 | Ando et al. | 127/46.1 |
| 4,631,129 A | 12/1986 | Heikkila | 210/635 |
| 4,636,315 A | 1/1987 | Allen, Jr. | 210/656 |
| 4,666,527 A | 5/1987 | Ito et al. | 127/60 |
| 4,724,006 A | 2/1988 | Day | 127/30 |
| 4,732,687 A | 3/1988 | Muller et al. | 210/656 |
| 4,837,315 A | 6/1989 | Kulprathipanja | 536/127 |
| 4,857,642 A | 8/1989 | Kulprathipanja | 536/127 |
| 4,873,111 A | 10/1989 | Aaltonen et al. | 426/623 |
| 4,938,804 A | 7/1990 | Heikkila et al. | 127/60 |
| 4,938,974 A | 7/1990 | Bichsel et al. | 426/74 |
| 4,940,548 A | 7/1990 | Zinnen | 210/656 |
| 4,955,363 A | 9/1990 | Harju et al. | 127/46.1 |
| 4,970,002 A | 11/1990 | Ando et al. | 210/659 |
| 4,976,865 A | 12/1990 | Sanchez et al. | 210/635 |
| 4,980,277 A | 12/1990 | Junnila | 435/2 |
| 4,990,259 A | 2/1991 | Kearney et al. | 210/659 |
| 5,032,156 A | 7/1991 | Luder et al. | 55/269 |
| 5,043,171 A | 8/1991 | Bichsel et al. | 426/74 |
| 5,081,026 A | 1/1992 | Heikkila et al. | 435/158 |
| 5,084,104 A | 1/1992 | Heikkila et al. | 127/46.2 |
| 5,102,553 A | 4/1992 | Kearney et al. | 210/659 |
| 5,122,275 A | 6/1992 | Rasche | 210/659 |
| 5,124,133 A | 6/1992 | Schoenrock | 422/191 |
| 5,127,957 A | 7/1992 | Heikkila et al. | 127/47 |
| 5,156,736 A | 10/1992 | Schoenrock | 210/264 |
| 5,177,008 A | 1/1993 | Kampen | 435/139 |
| 5,198,120 A | 3/1993 | Masuda et al. | 210/659 |
| 5,225,580 A | 7/1993 | Zinnen | 554/30 |
| 5,382,294 A | 1/1995 | Rimedio et al. | 127/42 |
| 5,384,035 A | 1/1995 | Smolnik et al. | 210/635 |
| 5,387,347 A | 2/1995 | Rothchild | 210/659 |
| 5,482,631 A | 1/1996 | Saska et al. | 210/635 |
| 5,494,525 A | 2/1996 | Heikkila et al. | 127/61 |
| 5,637,225 A | 6/1997 | Heikkila et al. | 210/659 |
| 5,730,877 A | 3/1998 | Heikkila et al. | 210/659 |
| 5,770,061 A | 6/1998 | Heikkila et al. | 210/198.2 |
| 5,773,052 A | 6/1998 | Virtanen et al. | 426/2 |
| 5,795,398 A | 8/1998 | Hyoky et al. | 127/46.1 |
| 5,851,405 A | 12/1998 | Paananen et al. | 210/724 |
| 5,858,424 A | 1/1999 | Virkki et al. | 426/54 |
| 5,932,016 A | 8/1999 | Paananen et al. | 127/48 |
| 5,951,777 A | 9/1999 | Nurmi et al. | 127/61 |
| 5,980,640 A | 11/1999 | Nurmi et al. | 127/60 |
| 6,022,394 A | 2/2000 | Paananen et al. | 71/26 |
| 6,093,326 A | 7/2000 | Heikkila et al. | 210/659 |
| 6,187,204 B1 | 2/2001 | Heikkild et al. | 210/659 |
| 6,214,125 B1 | 4/2001 | Hyoky et al. | 127/46.1 |
| 6,224,776 B1 | 5/2001 | Heikkila et al. | 210/659 |
| 6,482,268 B2 | 11/2002 | Hyoky et al. | 127/46.1 |
| 6,896,811 B2 * | 5/2005 | Heikkila et al. | 210/659 |

FOREIGN PATENT DOCUMENTS

| | | |
|---|---|---|
| DE | 2 300 492 | 7/1973 |
| DE | 23 62 211 | 6/1975 |
| DE | 25 11 904 | 9/1976 |
| DE | 40 41 414 A1 | 6/1991 |
| EP | 0 010 769 A2 | 5/1980 |
| EP | 0 101 304 A2 | 2/1984 |
| EP | 0 279 946 A2 | 8/1988 |
| EP | 0 345 511 A3 | 12/1989 |
| EP | 0345511.2 | 12/1989 |
| EP | 94/17213 A1 | 8/1994 |
| EP | 0 663 224 A1 | 7/1995 |
| FI | 68526 | 6/1985 |
| FI | 75503 | 3/1988 |
| FI | 875655 | 6/1988 |
| FI | 77845 | 1/1989 |
| FI | 86416 | 5/1992 |
| GB | 715774 | 12/1951 |
| GB | 715774 | 9/1954 |
| GB | 43494/70 | 10/1969 |
| GB | 1326765 | 9/1970 |
| GB | 1 448 524 | 12/1974 |
| GB | 2 240 053 A | 7/1991 |
| JP | 39-5429 | 4/1964 |
| SU | 445270 | 6/1976 |
| SU | 1072818 A | 2/1981 |
| WO | PCT/FI81/00014 | 2/1981 |
| WO | PCT/US82/00712 | 5/1982 |

| WO | WO 81/02420 | 6/1982 |
|---|---|---|
| WO | PCT/F187/00162 | 12/1987 |
| WO | PCT/US89/05572 | 12/1989 |
| WO | PCT/US90/00015 | 1/1990 |
| WO | PCT/US90/07024 | 11/1990 |
| WO | 94/263880 A1 | 11/1994 |
| WO | PCT/US98/00115 | 1/1998 |

OTHER PUBLICATIONS

Japanese Application No. 63-276028 filed Nov. 2, 1988, Publication No. 2-124895 published May 14, 1990 of Moinaga Nyugy KK pertains to a Method for The Separation of Lactulose.

Abstract: Japanese Appl. No. 59-183571 filed Aug. 31, 1984, Publication No. 61-063291 (1063291), published Apr. 1, 1986 of Dai Ichi Kogyo Seiyaku Co., Ltd. pertains to the Production of Xylitol Through Enzymatic Process.

Abstract: Japanese Application No. 62-235014 filed Aug. 21, 1987, Publication No. 64-080409 published Mar. 27, 1989 of Japan Organo Co., Ltd. pertains to a False Moving Bed Device.

Abstract: Japanese Application No. 60-244968 filed Oct. 30, 1985, Publication No. 62-104588 (2104588), published May 15, 1987 of Nitto Electric Ind. Co., Ltd., pertains to Production of Xylitol.

Abstract: Japanese Application No. 59-1411 filed Jan. 10, 1984, Publication No. 60-145095 (0145095), published Jul. 31, 1995 of Jiyuujiyou Seishi KK; pertains to Preparation of Xylitol By Immobilized Microorganism.

Diagram: *Molasses and Betaine SMB Separation Daily Material Balance*, accompanied by Charts: *Betaine Separation In Renville, Preliminary Investment Cost*, by Peter Norrman of Finnsugar Ltd., Mar. 7, 1993, with cover letter of Mar. 8, 1993 (F44079-F44082).

Document: Technical Report 8: *Alternative Separation Methods* by Goran Hyoky, Jan. 21, 1994 (F45083-F45093).

*The Development and Application of Continuous Ion Exclusion* by Karl W.R. Schoenrock of the Amalgamated Sugar Company, presented to the 18th General Assembly, Commission International De Sucrerie, Ferrara, Jun. 8-12, 1987 (F019312-F019324).

Document: *Some Technical and Economic Aspects of The Chromatographic Separation of Sugar Solutions* with special emphasis on the Finnsugar Desugarization Process by H. Hongisto, Finnish Sugar Company Ltd. presented to British Sugar Corporation Ltd. 23rd Technical Conference in Eastbourne, Jun. 1976, (other Hongisto publications are listed in the Information Disclosure Statement of Apr. 6, 1999, items 167, 168, 177, 181, 191, 197 and 198) (F004309-F004334).

Document: *Large-Scale Adsorption and Chromatography*, vol. I, by Phillip C. Wankat, published by CRC Press, Inc. pp. 1-5, 1986 (A020962-A020971).

Document: *Large-Scale Adsorption and Chromatography*, vol. II, by Phillip C. Wankat, published by CRC Press, Inc., pp. 1-113, 1986 (A020972-A021072).

Document: *Ion Exclusion Purification of Molasses* by J.B. Stark, 1964 (other Stark publications and a Stark Patent are listed in the Information Disclosure Statement of Apr. 6, 1999, items 19, 172 and 173) (A014923-A014933).

Publication: *"Continuous Chromatographic Separation Of Fructose/Glucose"* by Tetsuya Hirota of Mitsubishi Chemical Industries, Ltd., published *Sugar y Azucar* Jan. 1980.

Document: *Purolite, Chromatographic Ion-exchange Resins*, undated.

Publication "Sugar" by Encyclopedia Britannica, Britannica.com, pp. 1-8 (2000).

Publication "II.F.2—Sugar" by The Cambridge World History ofFood, pp. 1-20 (at least as early as Feb. 2001).

Publication "US Sugarbeet Industry and Biotechnology" by Beet sugar Development Foundation, United States Beet Sugar Association and American Sugarbeet Growers Association, by AG ISSUES, American Crystal Sugar Company, pp. 1-9 (at least as early as Feb. 2001).

Publication: *"Outlook For Emerging Technologies In Sugar Processing"*, by Stephen J. Clarke, of Florida Crystals Corporation, Palm Beach, Florida, published by, *Agricultural Outlook Forum*, pp. 1-9 (Feb. 23, 1999).

Publication: *"Processing Sugar from Sugar Beets"*, by Dr. Mosen Asadi, Director of Research, published by Monitor Sugar Company: A Guide for Student and Chemists, pp. 1-5 (at least as early as Feb. 2001).

Publication: *"The History of Sugar in a Swedish Perspective"* by Danisco Sugar, in Dictionary of Sweeteners, pp. 1-5 (at least as early as Feb. 2001).

Publication: *"Making Waves In Liquid Processing —Advanced Technology In Liquid Process"* Illinois Water Treatment Company, published by *New Technology: IWT ADSEP™ System*, vol. NC, Mar. 4, 1983.

Publication "XYLITOL":Technology and Business Opportunities by Soumitra Biswas and Nirmala Vashishtha, published in News and Views, pp. 1-10 (at least as early as Feb. 2001).

Document, Graph and Diagram: Technical Report Apr. 1993 by Goran Hyoky for SMBSC/Cultor Joint Research Project, Aug. 13, 1993 (F45063-F45082).

Document: SMBSC/Cultor Joint Research Project, *Research Schedule*, for Mar.-Jun. 1993 by Goran Hyoky updated Mar. 17, 1993.

Publication: "Continuous Chromatographic Separation Of Fructose/Glucose" by Tetsuya Hirota of Mitsubishi Chemical Industries, Ltd., published Sugar y Azucar Jan. 1980.

Publication: "pH Control in the Sugar Mill" by Jorgi M. Day, ChE, presented at Instrument Society of America Puerto Rico Section, San Juan, Puerto Rico, pp. 1-21 (Mar. 1996).

Dorfner, K., Ion Exchangers, Properties and Applications, Ann Arbor Science Publisher Inc. pp. 44-45, undated.

Allenza, P., Scherl, D., and Detroy, R., Hydrolysis of Xylan by an Immobilized Xylanase from Aureobasidium pullulans, Biotechnology and Bioengineering Symp. No. 17 (1986) pp. 425-433.

Onishi et al., The Production of Xylitol, L-Arabinitol and Ribitol by Yeasts, Agr. Biol.Chem., vol. 30, No. 11, 1996, pp. 1139 amd 1144.

Publication: "Chromatography of Oligosaccharides and Related Compounds on Ion-Exchange Resin" by Department of Engineering Chemistry, Chalmers University of Technology, Goteborg, Sweden, Advances in Chromatography, vol. 16, pp. 113-149 (1978).

Publication: "Ion-Exchange Chromatography of Aldehydes, Ketones, Ethers, Alcohols, Polyols and Saccharids" published in Journal of Chromatographprinted by Chromatographic Reviews, Elsevier Scientific Publishing Company, Amsterdam-Printed in The Netherlands, 98 pp. 55-104 (1974).

Publication: "Proceedings Of The Research Society Of Japan Sugar Refineries'Technologists", edited by The Research Institute Of The Japan Sugar Refiners'Association, vol. 27, Aug. 1977.

Publication: "Purification Of Sugar Products By The Ion Exclusion Process" by D. Gross of Tate & Lyle, Ltd., Research Centre, Keston, Kent, England; presented to the 14th General Assembly, C.I.T.S; Brussels, 1971.

Publication: Processing Equipment: "High-volume chromatography separates the 'hard to separate'organic compounds", Food Engineering, May, 1983.

Publication: "Simultaneously Continuous Separation of Glucose, Maltose, and Maltriose Using a Simulated Moving-Bed Adsorber" by Kyu Beom Kim, Shiro Kishihara, and Satoshi Fujii of The Graduate School of Science and Technology, Kobe University, I, Rokkadai, Nada-ku, Kobe 657, Japan Received Sep. 2, 1991.

Publication: "Chromatographic Separation: A Sequential Chromatographic Process for the Separation of Glucose/Fructose Mixtures", by P. E. Barker, C. H. Chuah of the Chemical Engineering Department, University of Aston in Birmingham, Gosta Green, Birmingham, The Chemical Engineer, (Aug./Sep. 1981), pp. 389-393.

Publication: "On The Utilization Of Betaine From Sugar Beets" by J.P. Dubois, Raffinerie Tirlementoise, s.a., D-3300 Tienan (Belgium), undated.

Publication: S.I.T. Paper #649: "An Audubon Sugar Institute-Applexion Process For Desugarization Of Cane Molasses", by M. Saska, Ch, Pelletan, Mei Di Wu and X. Lancrenon, presented at the 1993 Sugar Industry Technologists Meeting, Jun. 13-16, 1993, Toronto Ontario.

Publication: S.I.T. Paper #428: "Liquid Sugar From The Chromatographic Molasses Desugarization Process" by H. J. Hongisto, Finnish Sugar Co., Ltd., Kantvik, Finland, vol. XXXVIII, publication of Technical Papers and Proceedings of the 38th Annual Meeting of Sugar Industry Technologists, Inc., Boston, Massachusetts, May 6-9, 1979.

Publication: "Desugarisation of Cane Molasses By the Finnsugar Chromatographic Separation Process", By H. Hongisto and H. Heikkila, reprint ISSCT (1977).

Publication: "Beet Sugar" by Michael Cleary of Imperial Holly Corporation appearing in Kurk-Othmer, Encyclopedia Of Chemical Technology, Fourth Edition, vol. 23, published by John Wiley & Sons, Wiley-Interscience (1997).

Publication: Process Technology: "Separating Sugars And Amino Acids With Chromatography", by Heikki Heikkila, Finnish Sugar Co., Ltd., Chemical Engineering Jan. 24, 1983, pp. 50-52.

Publication: "Trends In The Chromatographic Separation Of Molasses", by Hannu A. Paananen, Zuckerind 122 (1997) No. 1, pp. 28-33.

Publication: "Engineering Analysis Of Ion Exclusion For Sucrose Recovery from Beet Molasses, Part 1 Experimental Procedures And Data Reduction Techniques" by W.G. Schultz, J. B. Stark and E. Lowe, Western Regional Research Laboratory, Western Utilization Research And Development Division, Agricultural Research Service, U.S. Department of Agriculture, Albany, California, 94710 U.S.A., published in the International Sugar Journal, Feb. 1967.

Publication: S.I.T. Paper 373: "The Recovery Of Sugar From Beet Molasses By Ion Exclusion", by James F. Zieverz and C. J. Novotny, Industrial Filter & Pump Mfg. Co., Cicero, Illinois, undated.

Publication: "Recovery Of Sugar From Beet Molasses By The P. & L. Exclusion Process", by H.G. Schneider and J. Mikule of Pfeifer & Langen, Euskirchen, Germany, published in the International Sugar Journal, Part I, pp. 259-264, Sep. 1975.

Publication: "Recovery of Sugar From Beet Molasses by The P. & L. Exclusion Process", by H.G. Schneider and J. Mikulse of Pfeifer & Langen, Euskirchen, Germany, published in the International Sugar Journal, Part II, pp. 294-298, Oct., 1975.

Publication: Chromatographic Separation of Sugar Solutions: "The Finnsugar Molasses Desugarization Process", Part II, by H. J. Hongisto, Technical Department, Finnish Sugar Company, Ltd., Kantvik, Finland, published by the International Sugar Journal, May 1977, pp. 132-134.

Publication: "Trends In The Chromatographic Separation Of Molasses", by Human A. Paananen of Cultor Ltd., Finnsugar Bioproducts, Helsinki, Finland, Proceedings of the Workshop on Separation Process in the Sugar Industry, New Orleans, Apr. 1996, pp. 100-119.

Publication: ARi: "Coupled Loop Chromatography" by Mike Kearney of Amalgamated Research, Inc., presented at the 29th General Meeting, American Society of Beet Sugar Technologists, Mar. 1977.

Publication: "Simulated Moving-Bed Technology In The Sweetener Industry", by D. Eugene Rearick. Michael Kearney, and Dennis D. Costesso of Amalgamated Research, Inc., published in Chemtech, vol. 27, No. 9, pp. 36-40, undated.

Publication: "Desugarisation Of Beet Molasses By the Finnsugar Chromatographic Separation Process", by H. Hongisto, Finnsugar Engineering, undated.

Publication: SPRI: "Trends In The Chromatographic Separation of Molasses", by Hannu A. Paananen of Cultor, Ltd., Finnsugar Bioproducts, Helsinki, Finland, presented at the Proceedings of the 1996 Workshop on Separation Process in the Sugar Industry.

Publication: "The Recovery Of Sugar From Beet Molasses By the P. & L. Exclusion-Process", by H. G. Schneider and J. Mikule of Pfeifen & Lange, Euskirchen, Germany, undated.

Publication: "Engineerer Fractal Cascades For Fluid Control Applications" by Mike Kearney of Amalgamated Research, Inc., Twin Falls, Idaho, undated.

Publication: "Control Of Fluid Dynamics With Engineered Fractal Cascades-Adsorption Process Applications", by Mike Kearney, Director, New Technology, Amalgamated Research Inc., Twin Falls Idaho 1997.

Publication: "Molasses Exhaustion Session", Keynote Speech Summary, by Mike Kearney, Director, New Technology, Amalgamated Research Inc., published by British Sugar Euro TechLink97, England, undated.

Publication: "Multicomponent Separation Using Simulated Moving Bed Chromatography", by V. Kochergin and M. Kearney of Amalgamated Research, Inc., presented at AIChE Annual Meeting, Los Angeles, Nov. 16-21, 1997, Novel Adsorption-Based Separation Equipment Configuration, AIChE Proceedings, Part 2, pp. 1539-1544.

Publication: "Molassesdesugarization with Liquid Distribution Chromatography", by Dr. Mohammad Munir, Zentral-Laboratorium dor Suddautschen Zucker-Aktiengesollschaft, presented at 15th General Assembly of Commission Internationale Technique de Sucrerie, Vienna, Austria, May 12-16, 1975.

Publication: "Ion Exclusion . . . an overlooked ally", by James F. Zievers, C. J. Novotny, and E. A. Selvick of Industrial Filter and Pump Mfg. Co., Cicero, Illinois, published in The Sugar Journal, Feb. 1972, pp. 7-10.

Publication: "Ion Exchange For Desugaring Of Molasses And Byproduct Sugarbeet and Sugarcane", by L.H. Ramm-Schmidt, published by B.V. Amsterdam, 1988, printed in Netherlands, pp. 111-126.

Publication: "Application Of The Finnsugar-Pfeifer & Langen Molasses Desugarisation Process In A Beet Sugar Factory", by H. J. Hongisto and P. Laakso, undated.

Publication: "The Removal Of Color From Sugar Solutions By Adsorbent Resins", by R. I. M. Abrams, Technical manager of Duplite Ion Exchange Resins, Diamond Shamrock Chemical Company, Redwood City, California, published in Sugar y Azuca, 1971, pp. 31-34.

Publication: "Simulated Moving Bed Technology Applied To The Chromatographic Recovery Of Sucrose Form Syrups", by Mike Kearney of The Amalgamated Sugar Company, Twin Falls, Idaho, presented at Conference on Sugar Processing Research, Fiftieth Anniversary Conference, San Francisco, California, May 29-Jun. 1, 1990.

Publication: Ion Exclusion- An Overlooked Ally: "Ion Exclusion Ion Exclusion Experiments", by James F. Zievers, C. J. Novotny, and E. A. Selvick of Industrial Filter and Pump Mfg. Co., Cicero, Illinois, Oct. 4, 1970, pp. 12-24.

Publication: "Separation Processes In The Sugar Industry", by Sugar Processing Research Institute, Inc., New Orleans, Louisiana, presented at Proceedings of S.P.R.I. Workshop on Separation Processes In the Sugar Industry, Workshop Panel Discussion-Day 1, Oct. 1996, pp. 151-153.

Publication: "New Development In The Chromatographic Desugarisation Of Beet Molasses", by Francois Rouseet, Applexion, France, published by British Sugar EuroTechLink 97, York England, undated.

Publication: "Chromatographic Separation Of Sugar Solutions The Finnsugar Molasses Desugarization Process", by H. J. Hongisto, Technical Department, Finnish Sugar Company, Ltd., Kantvik, Finland, presented to the 23rd Tech. Conf., British Sugar Corp. Ltd, 1976, Part I published in International Sugar Journal, Apr. 1977, pp. 100-104.

Publication: "Chromatographic Separation Of Sugar Solutions The Finnsugar Molasses Desugarization Process", by H. J. Hongisto, Technical Department, Finnish Sugar Company, Ltd., Kantvik, Finland, presented to the 23rd Tech. Conf., British Sugar Corp. Ltd, 1976, Part II published in International Sugar Journal, Apr. 1977, pp. 131-134.

Publication: "Ion Exclusion Purification Of Sugar Juices", by Lloyd Norman, Guy Rorabaugh, and Harold Keller, Research Laboratory Manager and General Chemist, Director of Research, Holly Sugar Corporation and Assistant Director, Illinois Water Treatment Company, published by Journal of A. S. S. B. T., vol. 12, No. 5, Apr. 1963, pp. 362-370.

Publication: "Chemical Educators Stress Industry Ties" by Ward Worthy and Richard J. Seltzer of C&EN Washington, published Oct. 6, 1975, C&EN.

Publication: "Adsorption Separates Xylenes" by Seiya Otani of Toray Industries, Inc., published by Chemical Engineering, Sep. 17, 1973.

Publication: "Designing Large-Scale Adsorptive Separations" by E.N. Lightfoot, S.J. Gibbs, A.M. Athalye and T.H. Scholten of Department of Chemical Engineering, University of Wisconsin, Madison, WI., published Isreal Journal of Chemistry, vol. 30, 1990, pp. 229-223.

Publication: "Mechanism Of The Separation Of Glucose And Fructose On A Strong-Acid Cation Exchanger" by Charles A. Sauer of Applications Development, Duolite International, Inc., a subsidiary of Diamond Shamrock Corporation, Apr. 23, 1981.

Publication: "High Purity Fructose Via Continuous Adsorptive Separation" by D.B. Broughton, H.J. Bieser, R.C. Berg, E.D. Connell, D.J. Korous, and R.W. Neuzil of UOP, Inc., published La Sucrerie Belge, vol. 96-Mai 1977, pp. 155-162.

Publication: "Large-Scale Chromatography: New Separation Tool" by R.S. Timmins, L Mir, and J.M. Ryan of Abcor, Inc., published by Chemical Engineering, May 19, 1969, pp. 170-178.

Publication: "The Tasco Chromatographic Separator At Twin Falls Factory" by K. P. Chertudi of The Amalgamated Sugar Company, published by International Sugar Journal, 1991, vol. 93, No. 1106.

Publication: "The Amalgamated Sugar Company Raw Juice Chromatographic Separation Process" by Mike Keaney and D. Eugene Rearick of The Amalgamated Sugar Company Research Laboratory, Twin Falls, Idaho, presented at 1995, C.I.T.S. 20th General Assembly, Munich, Germany, Jun. 1995.

Publication: "Production Of Raffinose: A New By-Product Of the Beet Sugar Industry" by K. Sayama, T. Kamada, and S. Oikawa of Nippon Beet Sugar Mfg Co Ltd., Japan, presented at British Sugar plc Technical Conference Eastbourne, 1992.

* cited by examiner

CHROMATOGRAPHIC SEPARATION METHOD

CROSS REFERENCE TO RELATED APPLICATION

This application is a continuation application of U.S. patent application Ser. No. 10/143,188 filed May 9, 2002 now U.S. Pat. No. 6,896,811 which claims priority to Finland Appln. No. 20010977 filed May 9, 2001.

FIELD OF THE INVENTION

The present invention relates to a method for fractionating a solution into two or more fractions advantageously enriched with different components, and more particularly to a method for fractionating a solution by a chromatographic simulated moving bed (SMB) process in which the dissolved substances present in the feedstock are separated in the chromatographic separation loop of partial packed beds, and the formed separation profile (i.e. dry solids profile also referred to as a dry substance profile or DS profile) is circulated more than once or less than once through one chromatographic separation loop during one cycle. In a preferred embodiment of the invention the separation profile is circulated twice through the separation loop during one cycle. In another preferred embodiment of the invention the feeding point is circled to a different point compared to the feeding point in the previous cycle. This is called feeding point advancement of the separation profile and the feeding point advancement can be done more than once or less than once through the chromatographic separation loop during one cycle.

The novel chromatographic SMB method improves the separation capacity by better utilisation of the resin bed.

BACKGROUND OF THE INVENTION

The continuous simulated moving bed process has been disclosed already in U.S. Pat. No. 2,985,589 (Broughton et al.). In accordance with this process the mixture to be fractionated is introduced into one partial packed bed and eluant is introduced into another partial packed bed, and two product fractions are withdrawn substantially simultaneously. There are at least four partial packed beds, forming a single loop with continuous circulation of a dry substance profile, and the feed and product withdrawal points are shifted continuously stepwise in the downstream direction in the loop of packing material beds essentially by the speed of the circulation of the dry substance profile in the loop.

For simulated moving bed chromatographic separation processes two or more loop and two or more profile modes have been developed in order to better utilise the chromatographic separation resin bed to achieve increased separation capacity, increased yields and fraction purities and fraction dry substance concentrations.

A sequential simulated moving bed process applied to the recovery of betaine and sucrose from beet molasses is described in the Applicants' Finnish Patent 86 416. In this method, one complete or essentially complete dry solids profile is circulated in a partial packing material loop. Also the Applicants' publications U.S. Pat. No. 6,093,326 and U.S. Pat. No. 5,637,225 relate to a simulated moving bed method, the first applied to the fractionation of molasses and the latter to the fractionation of sulphite cooking liquor. As is described in these patents, the simulated moving bed method may include multiple loops; and dry solids profile(s) is circulated in each loop.

Finnish Patent 86 416 referred to above discloses a method for recovering betaine and sucrose from beet molasses employing a simulated moving bed process. The chromatographic system comprises at least 3 chromatographic partial packed beds in series. In the method, betaine and sucrose are separated during the same sequence comprising a molasses feeding phase wherein the molasses feedstock is supplied to one of said partial packed beds and eluant water is supplied substantially simultaneously to another of said partial packed beds, an eluant feeding phase, and a circulating phase. These phases are repeated either once or several times during the sequence.

In the method disclosed in the above-stated U.S. Pat. No. 6,093,326, the liquid flow is effected in a system comprising at least two partial packed beds, and the product or products are recovered during a multistep sequence. A sequence comprises feeding, eluting and circulation phases. During the circulation phase, the liquid present in the partial packed beds with its dry solids profile is circulated in two or more loops comprising one, two or more partial packed beds. A loop may be closed or "open", in other words, when liquid is circulated in one loop, eluant can be introduced into the other loop and a product fraction can be withdrawn therefrom. During the feed and elution, the flow through the packing material beds may take place between successive loops, loops, wherein the flows carry material from one loop to another. During the circulating phase, column or columns form closed loop and are separated from the other loops. Essentially complete dry solids profile is circulated in each loop.

Publication WO 97/45185 discloses a method for fractionating a solution into two or more fractions by a chromatographic simulated moving bed process wherein the separation system comprises at least two separation profiles in the same loop. The method can be used for fractionating a sulphite cooking liquor to give a fraction rich in monosaccharides and/or a fraction rich in lignosulphonates. Furthermore, molasses or vinasse can be fractionated in that way to obtain fractions rich in sugar, such as sucrose, and/or betaine. In the method of the above mentioned publication, there are at least two separation profiles in the same loop. The minimum required bed length for the method is at least the length of two separation profiles without excess overlapping.

One of the problems associated with the above arrangements is that in order to get good separation result, high yields, purities and product fraction dry substance concentration, long chromatographic separation beds have to be used.

Another problem with the earlier arrangements is also that the dry substance profile(s) in the chromatographic separation beds do not necessarily fill the whole bed length or they may overfill the bed. As a rule, the dry substance profile should be formed so that high product fraction yields, purities, concentrations and high separation capacities are achieved. This means that chromatographic column load has to be high, e.g. the feed volume has to be large, in order to achieve high product fraction dry substance concentration and high separation capacities. High dry substance concentration means that the concentration is at least close to the partial concentration of the component(s) in the feed.

On the other hand, chromatographic separation bed(s) height has to be long to contain high enough number of theoretical plates in order to achieve high product purities and product yields.

$$L = N \cdot HETP \quad (1)$$

$$N = 16 \cdot (V_e/W)^2 \quad (2)$$

wherein L=length of the resin bed
N=number of the theoretical plates
HETP=height equivalent of the theoretical plate
$V_e$=elution volume
W=peak width.

In one situation the separation profile is narrow and chromatographic separation bed is long which may lead to a situation where part of the chromatographic separation column is not loaded with the separation profile causing poor utilisation of the bed.

Alternatively, if in another situation the dry substance profile is long and chromatographic separation bed needed for good separation is short leading to the overlapping of the dry substance profile from both ends of the profile occurs causing low purities and low yields.

In the above mentioned situations more advanced methods are required and the present invention provides a solution to the problems associated with both situations.

BRIEF SUMMARY OF THE INVENTION

An object of the present invention is thus to provide a method to solve the above problems. The objects of the invention can be achieved by a method characterized by what is stated in the claims. The preferred embodiments of the invention are disclosed in the Detailed Description of the Invention.

The present invention is based on a method for fractionating a solution by a chromatographic simulated moving bed (SMB) process in which the dissolved substances present in the feedstock are separated in the partial packed beds, and the formed separation profile (also referred to as a dry substance profile, dry solids profile DS profile) is circulated more than once or less than once through the chromatographic separation loop during one cycle. In other words the separation profile is circulated through the chromatographic separation loop in the separation system a number of times, which is substantially different than one. A separation profile can be formed by the feed solution and the dry substance recirculated. The separation profile can be formed either directly from the feed or if the feed is fed from one loop to another, the separation profile can be formed from the fraction or fractions of the previous loop. The feeding point of the separation profile can be advanced during one cycle either less than once or more than once through the chromatographic separation loop.

Normally, and especially in a sequential simulated moving bed (SMB) chromatographic separation the new sequence is started from the same location as the previous sequence. This means that the first step of the complete sequence is again done at the same location after the last step of the previous complete sequence.

In the present invention, a cycle can be formed of determined steps, which are carried out from 1 to several times during the same cycle. Typically the cycles are repeated until an equilibrium is reached and then the process is continued advantageously in equilibrium. The equilibrium is defined by the equilibrium of the dry substance profile, and the equilibrium of the dry substance profile is normally reached after approximately 7 cycles.

A complete process comprises all the phases, steps and/or cycles. The process can be complete when the phases, steps and/or cycles are repeated at the same location. A complete process can comprise several cycles. A cycle can be a predetermined number of steps or phases. One cycle can help determine the steps or phases, as well as circulating the separation profile during the cycle. Advantageously, the cycle is repeated so that its steps are at some phase repeated at the same locations at the columns. The order of the steps and/or phases can be predetermined, as well as its location. In one embodiment, the first step of the cycle is the feed step.

Advantageously, the steps, phases, and/or cycles can occur sequentially, consecutively, simultaneously, concurrently, or continuously. One or more pairs, sets or groups of chromatographic separation loops in the chromatographic separation system and process can be in series and/or in parallel. During the process, one or more loops can be open or closed.

In the sequential simulated moving bed process, all of the fluid streams do not flow continuously. The streams are: the supply of feed solution and eluant, the circulating of the separation profile, and the withdrawal of products (eluting phase; two to four or more products). The flow rate and the volumes of the different feeds and product fractions may be adjusted in accordance with the separation goals (yield, purity, capacity). The process commonly comprises three basic phases: feeding, elution and circulation. During the feeding phase, a feed solution, and possibly also an eluant during a simultaneous eluting phase, is introduced into a predetermined partial packed bed or predetermined partial packed beds. During the feeding phase and/or one or more other phases, two, three, four or even more product fractions can be withdrawn. During the elution phase, eluant is fed into the predetermined partial packed beds. During the circulating phase, no feed solution or eluant is supplied to the partial packed beds and no products are withdrawn. During one or several steps in a sequence, a simultaneous circulation phase and/or feeding and/or eluting phase can be in one loop or in different loops.

A novel simulated moving bed method has now been developed to solve the above mentioned problems. In one of the embodiments of the present invention the first step of the next cycle is not started at the same location after the previous cycle. In another embodiment of the present invention the first step is started at the same location after the previous cycles. In the new chromatographic separation method one or more separation profiles is/are circulated more than once or less than once through the chromatographic separation loop before all of the predetermined fractions are taken out or before the next feed or feeds and eluant or eluant feeds of the next cycle are fed in.

A more detailed explanation of the invention is provided in the following description and appended claims.

DETAILED DESCRIPTION OF THE INVENTION

The following is a detailed description and explanation of the preferred embodiments of the invention along with some examples thereof.

The present invention relates to a method for fractionating a solution by a chromatographic simulated moving bed process in which the liquid flow is effected in a system comprising one or more columns containing one or more partial packed beds. The dissolved substances present in the feedstock are separated in the partial packed beds, and a separation (i.e. dry solids) profile is formed. The columns/partial packed beds form one or several loops. The novel method is characterized in that the separation profile (also referred to as a dry substance profile, dry solids profile or DS profile) is circulated through the loop more than once or less than once during one cycle, in a preferred embodiment of the invention the separation profile is circulated twice during one cycle. This means that the separation profile is circulated through the loop in the separation system a number of times, which is substantially different than one.

Typical retention volumes of the desired products can be found in publications. The retention volume of each compound depends on various parameters for example packing material quality (e.g. ion form), elution conditions as a separation temperature and a flow. Typically retention volumes for monosaccharides and disaccharides are 40–80% of the bed volume, when cation exchange resins are used as a column filling material and water as an eluant. Retention volumes can be calculated in SMB-system e.g. from the volumes of the steps which are advancing the feed point(s) of the separation profile.

In the method of the invention, the product or products can be recovered using a multi (multiple)-step process or multi-phase process comprising one or more of the following phases: a feeding phase, eluting phase and circulation phase. A withdrawal phase or recovery phase for withdrawing or recovering one or more fractions and/or products can be included in one or more of the preceding phases or used as a separate phase.

In the feeding phase, the solution to be fractionated is introduced into the sectional packing material bed and simultaneously a corresponding amount of product fraction can be withdrawn from a later point downstream in the same sectional packing material bed or from a downstream sectional packing material bed connected with the bed. The feeding phase may include all sectional packing material beds in the chromatographic separation loop. Several feeds can be introduced during one cycle.

In the circulation phase, the liquid present in the sectional packing material bed with its dry solids profile is circulated in a loop comprising one, two or several sectional packing material beds; this may also include all the sectional packing material beds in the chromatographic separation loop of the system.

The eluting phase comprises feeding an eluant into one or more sectional packing material beds. During the eluting phase and/or one or more other phases, one or more product fractions can be withdrawn from a downstream point of the packing material bed or a downstream sectional packing material bed.

A process step comprises one or more of the above simultaneous identical or different phases, and the steps can be repeated from 1 to 50 times during the cycle.

The phases are employed to form cycles comprising several successive process steps. In accordance with the invention a cycle preferably comprises 1 to 50 steps.

A sequence comprising the steps can be repeated five to seven times to equilibrate the system whereafter the process is continued essentially in a state of equilibrium.

Typically from 1 to 28, preferably from 2 to 12, most preferably from 2 to 6 chromatographic sectional packing material beds combined into one or more loops are employed in the method of the invention. A loop may comprise one, two or several sectional packing material beds packed into one or more columns. The method comprises the use of loops in serial (series) or in parallel. The method can also be used either in one or several loops. It is also possible that there are several separation profiles in one loop.

A separation profile can be formed by the feed solution and the dry substance recirculated. The separation profile can be a complete or essentially complete dry solids profile. If the loops are in series, the separation profile can be formed of a part of the separation profile from the previous or subsequent loop. The separation profile can also be formed of the subprofile fraction or fractions of the profile present in the previous, subsequent or same loop. The separation profile can comprise constituents present in the feedstock of the profile, i.e. part of the constituents having a low migration rate, part of the constituents having an intermediate migration rate, and/or part of the constituents having a high migration rate. Part of the constituent having the highest migration rate can be withdrawn prior to the circulation phase.

A product fraction is a fraction taken out of the chromatographic separation process. There can be more than one product fractions.

A residue fraction is a fraction which contains less valuable product or products or by-product or by-products. There can be more than one residual fraction.

Recycle is a fraction which is recycled back to the column(s) or beds as such or combined with a starting material. There may also be an operation before returning the recycle to the column; for example it may be concentrated by evaporation. There can be more than one recycle fractions.

The method of the invention is particularly well suitable for separating substances that are difficult to separate from mixtures containing them. Such mixtures comprising the feed solution (feedstock) for the process can include: sulphite cooking liquors, molasses, especially B-molasses and/or C-molasses, vinasse, fructose and/or glucose syrups, beet-derived juices, invert sugar mixtures, starch hydrolysates, wood hydrolysates, milk whey solutions and other lactose-containing solutions, lactulose-containing solutions, maltose-containing solutions, maltitol-containing solutions, solutions containing amino acids, fermentation broths containing various organic acids, such as citric acid, gluconic acid, bagasse hydrolysates, solutions containing rhamnose, arabinose, mannose, raffinose, inositol, mannitol, sorbitol, xylitol, erythritol, glutamic acid, glycerol, tagatose, isomaltulose or trehalulose solutions, etc. In the preferred embodiments, the solution to be fractionated is sulphite cooking liquor or beet molasses.

As used in the application, the term "sulphite cooking liquor" means a liquor employed in the cooking of sulphite cellulose or a part thereof, a liquor ensuing from the cooking or a part thereof, a liquor used in the sulphite cooking or a part thereof or liquor removed from the sulphite cooking during the cooking or a part thereof.

The products of the method of the present invention can comprise one or more of the following: glucose, fructose, sucrose, betaine, rhamnose, arabinose, mannose, raffinose, lactose, lactulose, maltose, maltitol, inositol, mannitol, glycerol, xylitol, xylose, sorbitol, erythritol, organic acids, and/or especially amino acids, such as glutamic acid.

The chromatographic apparatus employed can comprise one column or several columns connected in series, fluid conduits connecting the columns, solution and eluant containers, feed and eluant conduits, circulation, eluant, recycle and feed pumps, heat exchangers, product fraction withdrawal conduits, valves, flow and pressure regulators and on-line measurements as concentration, density, optical activity and conductivity meters. The process is advantageously proceeded essentially within a state of equilibrium. The state of equilibrium is typically reached when the cycle is repeated, such as 6 or 7 times.

The number of columns is 1 to 28, preferably 2 to 12, most preferably from 2 to 6. Preferably, a column comprises one or several partial packed beds.

As packing material a column comprises advantageously an ion exchange resin, especially a cation or anion exchange resin. The cation exchange resin can be a weakly acid cation exchange resin or a strongly acid cation exchange resin. A strongly acid cation exchange resin, such as Finex CS 13 GC (manufacturer Finex Oy) is preferably used as a column packing material.

The temperature can preferably be between 10 and 90° C.

The pressure can preferably be from 1 to 15 bar.

The eluant employed can be a solvent, such as alcohol, or ethanol or water or a mixture thereof, especially a mixture of ethanol and water. Preferably the eluant comprises water.

The linear flow rate can range from 0.4 to 20 m/h, preferably from 1 to 12 m/h.

In one embodiment of the present invention, the method is characterized in that the separation system comprises at least one column and a cycle in the separation system comprises the following phases:

a) a feeding phase, wherein the feed solution is fed into one of the columns either alone or with recycled liquid and optionally substantially simultaneously eluant is fed into the next column, and during the feeding phase at least one product and/or at least one fraction other than the product is collected from the same or from a subsequent column;

b) a circulation phase, wherein liquid present in the loop(s) with its dry solids (DS) profile are circulated in the loop(s) and simultaneously nothing is fed into or collected from the loop(s);

c) an eluting phase, wherein the eluant is fed into one or more column(s) and residue and optionally a second product are collected from the same or from the subsequent columns.

The above phases from a) to c) can be used during a cycle, one (1) to several times.

One or more of the phases a) to c) can be in use simultaneously. If desired, phases a) to c) can also be carried out simultaneously in one step, one loop, in a column or in a part of a column.

In another embodiment of the present invention, the method is characterized in that the cycle in the separation system comprises the following phases:

a) a feeding phase wherein the feed solution is fed into one or more of the columns either above or with recycled liquid and optionally substantially simultaneously, an eluant is fed into the next or one or more downstream columns, and the first product and/or recycle and the residue are collected from the same or from the subsequent column(s);

b) a circulation phase, wherein liquid present in the loop with its dry solids (DS) profile is circulated in the loop(s) and simultaneously nothing is fed into or collected from the chromatographic separation loop(s) and;

c) an eluting phase, wherein the eluant is fed into one or more column(s) and residue and optionally a second product are collected from the same or from the subsequent column(s).

The above phases a) and c) can be used as many times as necessary until the separation profile has circulated through the chromatographic separation loop more than once or less than once during one cycle.

In one embodiment of the present invention, the separation profile is narrow and the chromatographic separation resin bed required for good separation result is long. In this embodiment, the separation profile is circulated through the chromatographic separation loop more than once; then the resin bed is well utilised. Well utilised means in this context that the separation profile essentially fills all packing material. The separation profile can be circulated for example 1.5 times, 1.7 times, twice, or 3 times etc. depending on the number of the columns. If the dry substance profile is circulated 1.5 times, it means that in a 6 column system the first step of the cycle is repeated during the next cycle three columns later. Advantageously, the separation profile is circulated twice.

In another embodiment of the present invention, the separation profile is long, i.e. broad and the bed length needed for the good separation is short. In this embodiment, the separation profile is circulated less than once through the chromatographic separation loop before the first step of the next cycle. The separation profile can also be circulated, for example 0.7 times, through the chromatographic separation loop. This means that for example in a 10 column system the first step of the next cycle is repeated already after 7 columns.

The method can comprise processing a feed solution comprising: (1) a feedstock, (2) a feed comprising a feedstock and a recycle liquid, or (3) a solution derived from any of the preceding, i.e. (1) or (2). Advantageously, the feed solution is processed in a chromatographic system comprising one or more loops. In the method, liquid derived from the feed solution with its dry solids (dry substance) (DS) profile is circulated in a circulation phase in at least one loop. Desirably, in this process, circulation comprises: (a) circulating the liquid with its dry solids profile more than once in the loop during a cycle, or (b) circulating the liquid with its dry solids profile less than once in the loop during a cycle.

In the method, at least one product is recovered during processing of molasses in one or more loops. Each loop can comprise one or more chromatographic beds, columns, or parts thereof which are separate and distinct from the chromatographic beds, columns, and parts thereof in the other loop(s). The loops can comprise a first loop and a second loop as well as more loops.

Processing can occur in at least one of the following phases: a feeding phase, an eluting phase, a circulation phase, and a recovery phase. Significantly, liquid present in each loop comprises more than one or less than one separate dry solids (dry substance) (DS) profiles (chromatographic separation profiles). At least some of the phases can occur sequentially, consecutively, simultaneously, concurrently, or continuously. Furthermore, there can be two or three parallel operations within one phase or step. There are many possibilities to arrange the steps, according to process design and conditions.

Part of the fractions withdrawn from a loop, e.g. product fraction, or liquid present in the loops with its dry solids profile(s) or portions thereof, can be recycled in a recycling phase of the loop to the same loop or to a different loop. In one method, a recycled fraction is recovered from the second loop and recycled to the first loop. The feed solution can also be derived from or include part or all of the recycle fraction.

The dry solids (dry substance) (DS) profile can be considered to be the dry substance concentration profile in the chromatographic separation resin beds, which is formed during the operation and processing of a simulated moving bed (SMB) process by feeding the feed solution and eluent into one or more separation columns in the loops and collecting the product fractions from one or more loops. Fast moving components can be concentrated in the front slope of the dry solids profile and slowing moving components can be concentrated in the back slope of the dry solids profile. By feeding eluent and feed solution containing constituents, by withdrawing product fractions, and by liquid flowing through the chromatographic bed(s), a dry solids profile can be formed in the chromatographic bed(s). Constituents having a relatively low migration rate in the chromatographic bed can be concentrated in the back slope of the dry solids profile. Constituents with a higher migration rate can be concentrated in the front slope of the dry solids profile.

The feedstock can comprise molasses and/or a feed material. The molasses can comprise: beet molasses, B molasses, C molasses, cane molasses, stillage, vinasse, wood molasses, biomass molasses, wheat molasses, barley molasses, or corn molasses. The molasses can comprise one or more solutions derived from molasses, including: raw juice, diffusion juice, thin juice, thick juice, dilute juice, residual juice, as well as other juices, and liquids. The method of this invention can be used to process molasses and solutions derived from any of the preceding.

The wood molasses and the biomass molasses can comprise a xylan-containing vegetable material, such as one or more of the following: wood, hardwood, birch, aspen, beech, eucalyptus, poplar, alder, particulates of grain straw, stems, hulls, husks, fiber, grains as wheat, corn, barley, rice and oat corn cobs, bagasse, almond shells, coconut shells, cotton seed bran, cotton seed skins, rice hulls, wood chips, and saw dust. The biomass molasses can also comprise biomass hydrolyzate. The biomass hydrolyzate can be obtained by a process, such as by: direct acid hydrolysis of biomass, prehydrolyzate obtained by prehydrolysis of biomass with steam or by enzymes, acid hydrolysis of prehydrolyzate obtained by prehydrolysis of biomass with acetic acid or steam or enzymes, steam explosion of biomass, spent liquor from pulping processes or a sulphite pulping process.

The wood molasses and the biomass hydrolyzate can comprise one or more of the following: sulphite cooking liquor, spent sulphite pulping liquor, acid spent sulphite liquor, spent liquor from hardwood, spent liquor from softwood pulping before hexoses are removed, spent liquor from softwood pulping after hexoses are removed, spent liquor from digestion of the biomass, spent liquor from hydrolysis of the biomass, spent liquor from solvent-based pulping, spent liquor from ethanol-based pulping, mother liquor from crystallization of xylose, diluted runoff of crystallization of sulphite spent pulping liquor, waste solution(s) from the paper industry, and/or waste solution(s) from the pulping industry.

The feed solution can comprises one or more compounds of: betaine, carbohydrates, monosaccharides, sugar alcohols, ionic substances, pentoses, such as xylose, arabinose, hexoses such as glucose, galactose, mannose and rhamnose, xylonic acid, lignosulphonates, or oligosacchadries, and combinations of the preceding.

The invention also offers an advantageous method particularly for the recovery of xylose from hardwood sulphite cooking liquor. The sulphite cooking liquor can be the liquor used in the cooking of sulphite cellulose, or the liquor ensuing from its cooking, or a part thereof. If desired, lignosulphonates can be recovered as the most rapidly eluted fraction and xylose which is the slowest to elute can be recovered as the product fraction.

The sulphite cooking liquor can comprise cooking chemicals, undissolved wood material, lignosulphonates, organic acids, hexose and pentose sugars derived as hydrolysis products of hemicellulose, as well as small amounts of oligosaccharides, if hydrolysis into monosaccharides has been incomplete. Normally a low pH in pulp cooking contributes to the hydrolysis of hemicellulose into monosaccharides. When the pulp is produced from hardwood, the major part of the monosaccharides contained in the cooking liquor can consist of xylose, which can be employed as a raw material in the production of crystalline xylose, xylitol and/or furfural. When pulp is produced from softwood, the prevalent monosaccharide in the cooking liquor is mannose.

The feed material can also comprise: fructose syrup, glucose syrup, invert sugar mixtures, starch hydrolysates, wood hydrolysates, milk whey solutions, lactose-containing solutions, lactulose-containing solutions, maltose-containing solutions, maltitol-containing solutions, amino acid-containing solutions, bagasse hydrolysates, fermentations broths containing citric acid, fermentation broths containing organic acid, or fermentation broths containing gluconic acid.

The processing can also comprise a circulating phase and at least one of the following phases: a feeding phase wherein the feed solution is fed into at least one location in the loop during a cycle and an eluting phase wherein an eluent is fed into at least one location into the loop during a cycle. Desirably, the processing further comprises fractionating the feed solution into at least two fractions in the loop by a chromatographic simulated moving bed (SMB) process after the feeding phase. Advantageously, fractions are recovered during processing by withdrawing the fractions from the loop(s). Each of the fractions to be withdrawn form the loop(s) can be withdrawn during one or more of the following phases: a recovery phase, feeding phase, or eluent (eluting) phase.

At least one of the fractions withdrawn from one of the loops during recovery, can provide a product fraction comprising a product. Desirably, the product fraction comprises a greater percentage concentration by weight on a dry solids (dry substance) (DS) basis of the product than in the feed solution.

Each loop in the chromatographic separation system can comprise one or more chromatographic beds, columns, or parts thereof, which are separate and distinct from the other loops. Furthermore, each loop can comprise one, two or several partial packing material beds. In sequential or continuous simulated moving bed (SMB) systems, the chromatographic bed(s) is typically divided into sub-sections. A chromatographic beds is usually packed with some type of chromatographic adsorbent, packing material. A partial packing material bed can comprise a section of a chromatographic separation resin bed, which is separated from the other sections of one or more resin beds, by some means, such as by intermediate bottoms, and feeding and collection devices or partial packing material beds which are located in the separate columns. The partial packing material bed can be any kind of sub-section of the chromatographic bed. The chromatographic bed(s) can be constructed of a single column or multiple columns, which are divided into section or compartments. The chromatographic bed can also be constructed of several discrete columns, tanks, or vessels, which are connected by pipelines.

Each loop can comprise a series of columns containing a cation exchange resin as a column filling material. Preferably, a strongly acid cation exchange resin comprises the beds. The strongly acid cation exchange resin can be in monovalent or divalent form. The monovalent form can comprise sodium, potassium or mixtures thereof. Divalent resin can comprise calcium and magnesium or mixtures thereof. The loops can have the same or different resins.

A strongly acid, gel-type cation exchange resin (e.g. "Zerolit 225", "Finex" or "Purolite") preferably in the sodium or potassium form can be used as a packing for the columns e.g. for the separation of cane molasses. Mg- and/or Ca-form can be used for separation of wood molasses e.g. by sulphite-cooking of hardwoods.

The fractions obtained from fractionation in the first loop and/or second loop can comprise one or more: sucrose fractions, betaine fractions, xylose fractions, residual fractions, or recycled fractions. Furthermore, the preceding fractions can comprise one or more compounds comprising: carbohydrates, betaine, sugars, hexoses as, glucose, galactose, rhamnose and mannose, pentoses such as xylose and arabinose, sugar alcohols, and/or xylonic acid.

The product fraction(s) can be recovered from the first loop and/or the second loop. In one preferred method, the product fraction comprises a sucrose fraction. One of the fractions from the first loop and/or the second loop can comprise a betaine fraction. Preferably, the betaine fraction, comprises a greater percentage concentration of betaine by weight on a dry solids (dry substance) (DS) basis than at least one of the other fractions in the loops.

Each loop is preferably different than the other loop(s). The dry solids (dry substance) (DS) profile(s) or portions (fractions) thereof in each loop can be circulated in the circulation phase and optionally recycled. Phases in the loops can be in the same phase or a different phase with each other. The loops can be open or closed. A solution, liquid, or fraction from one loop can be transferred or passed to another loop when the loops are open.

The feed solution can be pretreated before being fed to the first loop in at least one pretreatment process, such as: filtering, ultrafiltration, heating, hydrogenation, chromatography, concentrating, evaporation, neutralization, pH adjustment, volume adjustment, dilution, softening by carbonation, ion exchange or combinations of the preceding.

If desired, prior to the chromatographic fractionation, the feed solution (e.g. beet molasses) can be diluted with water, such as to 20% to 65% by weight, softened with sodium carbonate and finally filtered using diatomaceous earth as a filtering aid. Prior to feeding the feed solution into the separation columns, the molasses solution (feed) can be heated, such as to 40 to 85 degrees C. and even to 95 degrees C.

Furthermore, the solution derived from the first loop, which is fed and fractionated in another loop, e.g. loop 2, can be treated (pretreated) before being fed and fractionated into the other loop, in at least one treatment process such as: filtering, ultrafiltration, heating, hydrogenation, concentrating, evaporation, neutralization, pH adjustment, volume adjustment, dilution, softening by carbonation, ion exchange or combinations of the preceding. Between the loops, xylose can be converted into xylitol e.g. by hydrogenation.

Processing in the loops can comprises one or more of the following phases: one or more molasses feeding phases, one or more eluting phases of an eluent liquid, one or more circulation phases, and/or one or more recovery phase of at least one fraction and/or product. The phases can be combined and/or can occur simultaneously, concurrently, sequentially, consecutively, or continuously in the same or different loop.

The flow rate of the liquid in the beds and/or columns can range from 0.5 to 20 $m^3/h/m^2$, preferably 0.5 to 10 $m^3/h/m^2$. The eluent preferably comprises water. The temperature of the feed solution and the water can range from about 40 degrees C to 95 degrees C, preferably from about 40 to about 85 degrees C. The feed solution can have a dry solids (dry substance) (DS) content ranging from 20% to 80%, preferably 20% to 65% by weight dry solids. The flow rate of the operations can be controlled so that they end practically simultaneously. The flow in all columns can be continuous except for short pauses (brakes) during one or more step shifts.

In other preferred methods, the product fractions comprise one or more sucrose fractions, xylose or xylitol fractions, fructose fractions, or maltose fractions. The product fraction(s) can be crystallized into a crystallized product, such as crystallized sucrose, xylose or xylitol.

An advantageous feature of the method of the invention is that an optimized performance for the series of columns can be achieved. Another advantage of the present invention is that the same or improved capacity can be reached with a short total column length and with a less number of columns. Less number of columns means a lower investment cost.

It will be apparent to a person skilled in the art that, that the technology of the inventive concept can be implemented in various ways. The invention and its embodiments are not limited to the examples described below but may vary within the scope of the claims.

EXAMPLES

Example 1

Chromatographic Separation of Xylose from Sulphite Cooking Liquor

The test equipment included two columns connected in series, feed pump, circulation pump, eluant water pump as well as inlet and product valves for the various process streams. The height of each column was 4.6 m and each column had a diameter of 0.111 m. The columns were packed with a strong acid gel type cation exchange resin (Finex CS13GC) in $Mg^{2+}$ form. The mean bead size was 0.36 mm and the divinylbenzene content was 6.5%.

As a feed, sulphite cooking liquor from an $Mg^{2+}$ based cooking process was used and the aim was to separate the xylose contained therein.

The liquor was filtered using diatomaceous earth and diluted to a concentration of 48 weight %. The pH was 3.0. The sulphite cooking liquor had a composition as set forth below, whereby the percentages are given on a dry substance (DS) (dry solids) weight basis.

TABLE 1

| Composition of Feed | % on DS |
|---|---|
| Xylose | 14.3 |
| Glucose | 1.6 |
| Galactose + rhamnose | 1.5 |
| Mannose | 1.9 |
| Xylonic acid | 5.7 |
| Others | 75.0 |

The fractionation was performed by way of a 9-step SMB sequence as set forth below. The feed and the eluant were used at a temperature of 65° C. and water was used as an eluant.

Step 1: Feed solution was pumped into the first column at a flow rate of 45 l/h, firstly 2 l of recycle fraction and then 2.5 l of xylose fraction were collected from the second column.

Step 2: 11.2 l of feed solution was pumped into the first column at a flow rate of 45 l/h and a residual fraction was collected from the same column. Simultaneously water was pumped into the second column at a flow rate of 31 l/h and firstly 5.7 l of xylose fraction and then 2 l of recycle fraction were collected from the same column.

Step 3: 14.9 l were circulated in the column set loop (separation profile circulation was continued), formed with all columns, at a flow rate of 45 l/h.

Step 4: 11.5 l of water was pumped into the first column at a flow rate of 45 l/h and a residual fraction was collected from the second column.

Step 5: 14.9 l were circulated in the column set loop, formed with all columns, at a flow rate of 50 l/h.

Step 6: 11.5 l of water was pumped into the second column at a flow rate of 50 l/h and a residual fraction was collected from the first column.

Step 7: 14.4 l were circulated in the column set loop, formed with all columns, at a flow rate of 50 l/h.

Step 8: 11.5 l of water was pumped into the first column at a flow rate of 55 l/h and a residual fraction was collected from the second column.

Step 9: 10.4 l were circulated in the column set loop, formed with all columns, at a flow rate of 50 l/h.

With the above described steps, the separation profile was circulated two times over the loop, during one cycle. After equilibration of the system, the following fractions were drawn from the system: Two residual fractions from both columns, a xylose containing fraction from second column and two recycle fractions from second column. The results including HPLC analyses for combined fractions are set forth in the table below with the fractions indicated on a dry solids (DS) basis.

TABLE 2

|  | Xylose | Residual | Recycle |
| --- | --- | --- | --- |
| Volume, l | 8.2 | 45.7 | 4.0 |
| Dry solids (DS), g/100 ml | 22.3 | 14.6 | 19.4 |
| Xylose, % on DS | 54.5 | 1.0 | 48.8 |
| Glucose, % on DS | 3.7 | 0.9 | 3.8 |
| Galactose + Rhamnose, % on DS | 5.3 | 0.2 | 4.7 |
| Mannose, % on DS | 6.1 | 0.3 | 5.8 |
| Xylonic acid, % on DS | 10.5 | 3.5 | 12.0 |
| Others, % on DS | 20.0 | 94.1 | 24.9 |
| pH | 3.0 | 3.6 | 3.1 |

The overall xylose yield calculated from these fractions was 93.7% on a DS basis.

Example 2

Chromatographic Separation of Molasses

The test equipment included three columns connected in series, feed pump; circulation pumps, eluant water pump as well as inlet and product valves for the various process streams. The height of each column was 4 m and each column had a diameter of 0.111 m. The columns were packed with a strong acid gel type cation exchange resin in Na$^+$-form. The mean bead size is 0.36 mm and the divinylbenzene content was 6.5%.

The feed material was beet molasses, especially B-molasses. The molasses was diluted to 60 weight % and carbonated with sodium carbonate (1.5% on DS basis at a temperature of 60° C., 3 h reaction time). The carbonated solution is then filtered with a Seitz pressure filter using Kenite 300 as a filtering aid (precoat 1 kg/m$^2$, bodyfeed 0.5% on DS basis). The feed concentration was adjusted to 68.5 g/100 ml. The composition is set forth in the table below, whereby the percentages are given on a dry substance (DS) (dry solids) weight basis.

TABLE 3

| Composition of feed | % on DS |
| --- | --- |
| Sucrose | 72.2 |
| Betaine | 3.9 |
| Others | 23.9 |

The fractionation was performed by way of a 14-step SMB sequence as set forth below. The feed and the eluant were at a temperature of 85° C. and water was used as an eluant.

Step 1: 3.0 l of feed solution was pumped into the first column at a flow rate of 40 l/h and a recycle fraction is collected from column 3.

Step 2: 7.1 l of feed solution was pumped into the first column at a flow rate of 30 l/h and a residual fraction was collected from the same column. Simultaneously water was pumped into column 2 at a flow rate of 70 l/h and 3 l of recycle fraction and then 13.6 l of sucrose containing fraction were collected from column 3.

Step 3: 5.0 l of feed solution was pumped into the first column at a flow rate of 40 l/h and sucrose containing fraction was collected from column 3.

Step 4: 6.9 l was circulated in the column set loop (separation profile circulation is continued), formed with all columns, at a flow rate of 45 l/h.

Step 5: 7.1 l of water was pumped into the first column at a flow rate of 45 l/h and a residual fraction was collected from column 2. Simultaneously 4 /l of water are pumped into column 3 at a flow rate of 25 l/h and betaine containing fraction was collected from the same column.

Step 6: 12.2 l of water was pumped into the first column at a flow rate of 40 l/h and betaine containing fraction was collected from column 3.

Step 7: 7.1 l of water was pumped into the first column at a flow rate of 40 l/h and residual fraction was collected from column 3.

Step 8: 12.2 l was circulated in the column set loop, formed with all columns, at a flow rate of 45 l/h.

Step 9: 7.1 l of water was pumped into column 2 at a flow rate of 45 l/h and residual fraction is collected from column 1.

Step 10: 12.2 l was circulated in the column set loop, formed with all columns, at a flow rate of 45 l/h.

Step 11: 7.1 l of water was pumped into column 3 at a flow rate of 45 l/h and residual fraction was collected from column 2.

Step 12: 12.2 l was circulated in the column set loop, formed with all columns, at a flow rate of 45 l/h.

Step 13: 7.1 l of water was pumped into the first column at a flow rate of 45 l/h and residual fraction was collected from column 3.

Step 14: 9.2 l was circulated in the column set loop, formed with all columns, at a flow rate of 45 l/h.

With the above described steps, the separation profile was circulated two times over the loop, during one cycle. After equilibration of the system, the following fractions were drawn from the system: Two residual fractions from all columns, sucrose containing fractions from column 3, recycle fraction from column 3 and betaine containing fractions from column 3. The results including HPLC analyses for combined fractions are set forth in the table below with the fractions and yield indicated on a dry solids (DS) basis.

TABLE 4

| Fractions | Sucrose | Betaine | Recycle | Residual |
|---|---|---|---|---|
| Volume, l | 18.6 | 16.2 | 6.0 | 42.6 |
| Concentration, g/100 ml | 36.3 | 4.1 | 17.2 | 4.8 |
| Sucrose, % on DS | 94.8 | 4.8 | 61.9 | 16.0 |
| Betaine, % on DS | 0.0 | 60.4 | 0.0 | 0.4 |
| Others, % on DS | 5.2 | 34.8 | 38.1 | 83.6 |

The overall yield calculated from the product fractions was 94.7% for sucrose and 98.0% for betaine on a dry solids (DS) basis.

Example 3

Chromatographic Separation of Xylose from Sulphite Cooking Liquor

The test equipment included four columns connected in series, feed pump, circulation pump, eluant water pump as well as inlet and product valves for the various process streams. The height of each column was 5.0 m and each column had a diameter of 0.2 m. The columns were packed with a strong acid gel type cation exchange resin (Finex CS13GC) in $Mg^{2+}$-form. The mean bead size was 0.36 mm and the divinylbenzene content was 6.5%.

As a feed, sulphite cooking liquor from an $Mg^{2+}$-based cooking process was used and the aim was to separate the xylose contained therein.

The liquor was filtered using diatomaceous earth and diluted to a concentration of 48 weight %. The sulphite cooking liquor had a composition as set forth below, whereby the percentages are given on a dry substance (DS) (dry solids) weight basis.

TABLE 5

| Composition of Feed | % on DS Basis |
|---|---|
| Xylose | 14.9 |
| Glucose | 1.9 |
| Galactose + rhamnose | 1.6 |
| Mannose | 1.9 |
| Others | 79.7 |

The fractionation was performed by way of a 24-step SMB sequence as set forth below. The feed and the eluant were at a temperature of 65° C. and water was used as an eluant.

Step 1: 39 l of feed solution was pumped into the first column at a flow rate of 140 l/h and a residual fraction was collected from the same column. Simultaneously, water was pumped into the second column at a flow rate of 110 l/h and 5 l of recycle fraction and then 21 l of xylose fraction and 5 l of recycle fraction was collected from the column 4.

Step 2: 50.5 l were circulated in the loop (separation profile circulation was continued), formed with all columns, at a flow rate of 140 l/h.

Step 3: 40.5 l of water was pumped into the column 3 at a flow rate of 140 l/h and a residual fraction was collected from the second column.

Step 4: 50.5 l was circulated in the column set loop, formed with all columns, at a flow rate of 140 l/h.

Step 5: 40.5 l of water was pumped into the column 4 at a flow rate of 140 l/h and a residual fraction was collected from the column 3.

Step 6: 50.5 l was circulated in the column set loop, formed with all columns, at a flow rate of 140 l/h.

Step 7: 39 l of feed solution was pumped into the column 4 at a flow rate of 140 l/h and a residual fraction was collected from the same column. Simultaneously, water was pumped into the first column at a flow rate of 110 l/h and 5 l of recycle fraction and then 21 l of xylose fraction and 5 l of recycle fraction were collected from the column 3.

Step 8: 50.5 l were circulated in the column set loop, formed with all columns, at a flow rate of 140 l/h.

Step 9: 40.5 l of water was pumped into the second column at a flow rate of 140 l/h and a residual fraction was collected from the first column.

Step 10: 50.5 l was circulated in the column set loop, formed with all columns, at a flow rate of 140 l/h.

Step 11: 40.5 l of water was pumped into the column 3 at a flow rate of 140 l/h and a residual fraction was collected from the second column.

Step 12: 50.5 l was circulated in the column set loop, formed with all columns, at a flow rate of 140 l/h.

Step 13: 39 l of feed solution was pumped into the column 3 at a flow rate of 140 l/h and a residual fraction was collected from the same column. Simultaneously, water was pumped into the column 4 at a flow rate of 110 l/h and 5 l of recycle fraction and then 21 l of xylose fraction and 5 l of recycle fraction were collected from the second column.

Step 14: 50.5 l was circulated in the column set loop, formed with all columns, at a flow rate of 140 l/h.

Step 15: 40.5 l of water was pumped into the first column at a flow rate of 140 l/h and a residual fraction was collected from the column 4.

Step 16: 50.5 l was circulated in the column set loop, formed with all columns, at a flow rate of 140 l/h.

Step 17: 40.5 l of water was pumped into the second column at a flow rate of 140 l/h and a residual fraction is collected from the first column.

Step 18: 50.5 l was circulated in the column set loop, formed with all columns, at a flow rate of 140 l/h.

Step 19: 39 l of feed solution was pumped into the second column at a flow rate of 140 l/h and a residual fraction was collected from the same column. Simultaneously, water was pumped into the column 3 at a flow rate of 110 l/h and 5 l of recycle fraction and then 21 l of xylose fraction and 5 l of recycle fraction were collected from the first column.

Step 20: 50.5 l were circulated in the column set loop, formed with all columns, at a flow rate of 140 l/h.

Step 21: 40.5 l of water was pumped into the column 4 at a flow rate of 140 l/h and a residual fraction was collected from the column 3.

Step 22: 50.5 l was circulated in the column set loop, formed with all columns, at a flow rate of 140 l/h.

Step 23: 40.5 l of water was pumped into the first column at a flow rate of 140 l/h and a residual fraction was collected from the column 4.

Step 24: 50.5 l was circulated in the column set loop, formed with all columns, at a flow rate of 140 l/h.

With the above described steps, the separation profile was circulated ¾ times over the loop, during one cycle. After equilibration of the system, the following fractions were drawn from the system: three residual fractions from all columns, one xylose containing fraction from all columns and two recycle fractions from all columns. The results including HPLC analyses for the combined fractions are set forth in the table below with the fractions and yield indicated on a dry solids (DS) basis.

TABLE 6

|  | Xylose | Residual | Recycle |
|---|---|---|---|
| Volume, l | 21.0 | 120.0 | 10.0 |
| Dry solids, g/100 ml | 23.2 | 13.8 | 19.8 |
| Xylose, % on DS | 50.3 | 1.1 | 43.9 |
| Glucose, % on DS | 3.9 | 1.2 | 4.1 |
| Galactose + Rhamnose, % on DS | 5.5 | 0.2 | 4.9 |
| Mannose, % on DS | 5.8 | 0.3 | 5.9 |
| Others, % on DS | 34.5 | 97.2 | 41.2 |

The overall xylose yield calculated from these fractions was 93.1% on a dry solids (DS) basis.

Example 4

Chromatographic Separation of Fructose Syrup

The test equipment included two columns connected in series, feed pump, recycling pump, eluent water pump as well as inlet and product valves for the various process streams. The height of each column was 4.0 m and each column had a diameter of 0.2 m. The columns were packed with a strong acid gel type cation exchange resin (Finex CS 11 GC) in $Ca^{2+}$-form. The mean bead size was 0.36 mm and the divinylbenzene content was 5.5%. With these resin properties, typical retention for the fructose peak is approximately 75% of the bed volume.

As a feed, syrup from fructose process was used and the aim was to separate the fructose contained therein.

The liquor was filtered using a 10 micron filter bag and diluted to a concentration of 66 g/100 ml. The pH was 4.4. The fructose syrup was composed as set forth below, whereby the percentages are given on a dry substance (DS) (dry solids) weight basis:

TABLE 7

| Composition of Feed | |
|---|---|
| Fructose, % on DS | 93.4 |
| Glucose, % on DS | 2.0 |
| Disaccharides, % on DS | 3.7 |
| Others, % on DS | 0.9 |

The fractionation was performed by way of a 14-step SMB sequence as set forth below. The feed and the eluent were used at a temperature of 65° C. and water was used as an eluent.

Step 1: 9 l of feed solution was pumped into the first column at a flow rate of 90 l/h and a recycle fraction was collected from the second column.

Step 2: 31 l of feed solution was pumped into the first column at a flow rate of 90 l/h and a residual fraction was collected from the same column. Simultaneously, 49 l of water were pumped into the second column at a flow rate of 143 l/h and fructose fraction was collected from the same column.

Step 3: 60 l were circulated in the column set loop (separation profile circulation was continued), formed with all columns, at a flow rate of 90 l/h.

Step 4: 29 l of water was pumped into the first column at a flow rate of 90 l/h and a residual fraction was collected from the second column.

Step 5: 60 l were circulated in the column set loop, formed with all columns, at a flow rate of 90 l/h.

Step 6: 31 l of water was pumped into the second column at a flow rate of 90 l/h and a residual fraction was collected from the first column.

Step 7: 51 l were circulated in the column set loop, formed with all columns, at a flow rate of 90 l/h.

Step 8: 9 l of feed solution was pumped into the second column at a flow rate of 90 l/h and a recycle fraction was collected from the first column.

Step 9: 31 l of feed solution was pumped into the second column at a flow rate of 90 l/h and a residual fraction was collected from the same column. Simultaneously, 49 l of water was pumped into the first column at a flow rate of 143 l/h and fructose fraction was collected from the same column.

Step 10: 60 l were circulated in the column set loop, formed with all columns, at a flow rate of 90 l/h.

Step 11: 29 l of water was pumped into the second column at a flow rate of 90 l/h and a residual fraction was collected from the first column.

Step 12: 60 l were circulated in the column set loop, formed with all columns, at a flow rate of 90 l/h.

Step 13: 31 l of water was pumped into the first column at a flow rate of 90 l/h and a residual fraction was collected from the second column.

Step 14: 51 l were circulated in the column set loop, formed with all columns, at a flow rate of 90 l/h.

With the above described steps, the separation profile was circulated 3/2 times over the loop, during one cycle. This can be calculated from the step volumes: 9 l+31 l+60 l+29 l+60 l+31 l+51 l=271 l, which is 107.8% of the test equipment bed volume. Retention volume for fructose fraction was 271 l+9 l=280 l, which calculated for 3/2 circulations over the loop gives 74.3% of bed volume. This is in the range of the typical retention for the resin used in this example.

After equilibration of the system, the following fractions were drawn from the system: Three residual fractions from both columns, one fructose containing fraction and one recycle fraction from both columns. The result including HPLC analyses for combined fractions are set forth in the table below with the fractions and yield indicated on a dry solids (DS) basis.

TABLE 8

|  | Fructose | Residual | Recycle |
|---|---|---|---|
| Volume, l | 98 | 182 | 18 |
| Dry solids (DS), g/100 ml | 41.3 | 2.3 | 44.7 |
| Fructose, % on DS | 97.0 | 49.8 | 95.7 |
| Glucose, % on DS | 0.2 | 22.5 | 0.9 |
| Disaccharides, % on DS | 2.1 | 18.1 | 2.6 |
| Others, % on DS | 0.7 | 9.6 | 0.8 |
| pH | 4.2 | 4.3 | 4.3 |

The overall fructose yield calculated from these fractions was 95.0% on a dry solids (DS) basis.

Example 5

Chromatographic Separation of Maltose Syrup

The test equipment included three columns connected in series, feed pump, recycling pumps, eluent water pump as well as inlet and product valves for the various process streams. The height of each column was 3.4 m and each column had a diameter of 0.2 m. The columns were packed with a strong acid gel type cation exchange resin in $Na^+$-form. The mean bead size was 0.35 mm and the divinylbenzene content was 5.5%. With these resin properties typical retention for the maltose peak is approximately in the range of 54% of the bed volume.

The maltose syrup was evaporated to 55 weight % and then filtered with a Seitz pressure filter using Kenite 300 as a filtering aid (precoat 1 kg/m$^2$, bodyfeed 0.5% on DS (dry solids) basis). The feed concentration was adjusted to 55.5 g/100 ml. The pH was 4.1. The composition is set forth in the table below, whereby the percentages are given on a dry substance (DS) weight basis.

TABLE 9

| Composition of feed | |
|---|---|
| Maltose, % on DS | 84.6 |
| Malto-oligomers, % on DS | 4.7 |
| Maltotriose, % on DS | 1.6 |
| Glucose, % on DS | 7.3 |
| Others, % on DS | 1.8 |

The fractionation was performed by way of a 14-step SMB sequence as set forth below. The feed and the eluent were at a temperature of 80° C. and water was used as an eluent.

Step 1: 3 l of feed solution was pumped into the first column at a flow rate of 80 l/h and a recycle fraction was collected from column 3.

Step 2: 15 l of feed solution were pumped into the first column at a flow rate of 80 l/h and a residual fraction was collected from the same column. Simultaneously, water was pumped into column 2 at a flow rate of 200 l/h and 8 l of recycle fraction and then 32 l of maltose containing fraction were collected from column 3.

Step 3: 32 l of feed solution was pumped into the first column at a flow rate of 80 l/h and maltose containing fraction was collected from column 3.

Step 4: 8 l were circulated in the column set loop (separation profile circulation was continued), formed with all columns, at a flow rate of 120 l/h.

Step 5: 14 l of water was pumped into the column 3 at a flow rate of 120 l/h and a residual fraction was collected from column 2.

Step 6: 30 l were circulated in the column set loop, formed with all columns, at a flow rate of 120 l/h.

Step 7: 20 l of water was pumped into the first column at a flow rate of 120 l/h and residual fraction was collected from column 3.

Step 8: 30 l were circulated in the column set loop, formed with all columns, at a flow rate of 120 l/h.

Step 9: 20 l of water was pumped into column 2 at a flow rate of 120 l/h and residual fraction was collected from column 1.

Step 10: 29 l were circulated in the column set loop, formed with all columns, at a flow rate of 120 l/h.

Step 11: 18 l of water was pumped into column 3 at a flow rate of 120 l/h and residual fraction was collected from column 2.

Step 12: 38 l were circulated in the column set loop, formed with all columns, at a flow rate of 120 l/h.

Step 13: 15 l of water was pumped into the first column at a flow rate of 120 l/h and residual fraction was collected from column 3.

Step 14: 35 l were circulated in the column set loop, formed with all columns, at a flow rate of 120 l/h.

With the above described steps, the separation profile was circulated two times over the loop, during one cycle. This can be calculated from the step volumes: 3 l+15 l+32 l+8 l+14 l+30 l+20 l+30 l+20 l+29 l+18 l+38 l+15 l+35 l+=307 l, which is 95.9% of the test equipment bed volume. Retention volume for maltose fraction is 307 l+3 l-8 l=318 l, which when calculated for two circulations over the loop, was 49.6% of bed volume. This is in the range of the typical values for maltose retention for the resin used in the example.

After equilibration of the system, the following fractions were drawn from the system: Two residual fractions from all columns, maltose containing fraction from column 3 and recycle fraction from column 3. The result including HPLC analyses for combined fractions are set forth in the table below with the fractions and yield indicated on a dry solids (DS) basis.

TABLE 10

| Fractions | Maltose | Recycle | Residual |
|---|---|---|---|
| Volume, l | 64 | 11 | 102 |
| Concentration, g/100 ml | 32.3 | 20.1 | 4.6 |
| Maltose, % on DS | 96.6 | 93.1 | 27.0 |
| Malto-oligomers, % on DS | 0.6 | 2.7 | 24.0 |
| Maltotriose, % on DS | 0.6 | 2.5 | 5.5 |
| Glucose, % on DS | 2.2 | 1.6 | 35.9 |
| Others, % on DS | — | 0.1 | 7.6 |
| pH | 4.5 | 4.8 | 4.2 |

The overall maltose yield calculated from the product fractions was 94% on a dry solids (DS) basis.

Although embodiments and examples of the invention have been shown and described, it is to be understood that various modifications, substitutions, additions and rearrangements of parts, components, columns, beds, loops, equipment and method (process) steps, phases and/or cycles, as well as the use of different feed solutions, recycle solutions and eluents, and different concentrations thereof, and the recovery of different amounts or compositions of products and/or fractions, or at different temperatures, pressures, flow rates or other processing parameters, can be made by those skilled in the art without department from the novel spirit and scope of this invention.

What is claimed is:

1. A method for fractionating a solution into at least two fractions by a chromatographic simulated moving bed (SMB) process, comprising:

processing a solution in more than one cycle in at least one chromatographic separation loop in a chromatographic simulated moving bed (SMB) system having one or more columns containing chromatographic separation packing material resin beds comprising partial packed beds;

said solution comprising a feed solution comprising one or more of the following selected from the group consisting of a feedstock, a recycle liquid comprising a recycle fraction, liquid from a previous chromatographic separation loop, liquid from a subsequent loop, and a solution derived from any of the preceding;

forming at least one separation profile comprising a dry solids (DS) profile from said processing of said solution, said separation profile being narrow whereupon a length of chromatographic separation resin bed required for good separation is long in said loop;

each cycle comprising a predetermined number of steps in a predetermined order, said steps comprising the following different phases selected from the group consisting of a feeding phase, a circulation phase, an eluting phase, and a recycling phase; at least some of the phases occurring sequentially, consecutively, simultaneously, concurrently, or continuously;

said feeding phase comprising feeding said solution into one of the columns and drawing and collecting a product, a residue comprising a residual fraction and/or other fraction from the SMB system;

said eluting phase comprising feeding an eluant into one or more columns and drawing and collecting the product, the residue comprising the residual fraction and/or other fraction from the SMB system;

said recycling phase comprising recycling said recycle liquid comprising said recycle fraction to at least one of the columns;

said circulation phase comprising circulating said solution with said dry solid (DS) profile through said columns of said loop while substantially preventing and without feeding further solution to said columns during said circulation phase and while substantially preventing and without drawing and collecting said products or fractions from the columns or loops of the SMB system during said circulation phase; and said dry solids (DS) profile being circulated with said solution more than once through said columns of said loop during said cycle so that said separation profile passes through said chromatographic separation loop in said SMB system more than once during each cycle using said steps and phases.

2. A method according to claim 1 wherein the separation profile is circulated through the columns of the chromatographic separation loop in the SMB system during each cycle, 1.5, 1.7, 2 or 3 times.

3. A method according to claim 1 wherein the separation profile essentially fills packing material column(s) in said chromatographic separation loop.

4. A method according to claim 1 wherein: said eluting phase is different than and occurs simultaneously or at a different time than said recycling phase;

said eluting phase is different than and occurs simultaneously or at a different time than said feeding phase;

said circulation phase is different than and occurs simultaneously or at a different time than said feeding phase;

said circulation phase is different than and occurs simultaneously or at a different time than said eluting phase; and said phases are used one or more times in one or more steps during each cycle.

5. A method according to claim 1 wherein the feeding phase and recycling phase are carried out simultaneously or at a different time in one step, in one loop, in a column or in a part of a column.

6. A method according to claim 1 wherein the simulated moving bed (SMB) process is sequential.

7. A method according to claim 1 wherein the chromatographic separation system comprises two or more different loops, each loop comprising an SMB system separate and distinct from the SMB system of another loop.

8. A method according to claim 7 wherein the composition of the resin beds in one loop is the same or different than the resin beds in another loop.

9. A method according to claim 7 wherein one of the resin beds in one of said loops is in monovalent form and one of the resin beds in another one of said loops is in divalent form.

10. A method according to claim 7 wherein a resin bed of the first loop has a different degree of cross linking than a resin bed of the second loop.

11. A method according to claim 7 wherein the resin beds of the loops have similar or different particles sizes.

12. A method according to claim 7 wherein the pH of the feed solution in the first loop is the same or different than the pH of the solution in a second loop.

13. A method according to claim 1 wherein the chromatographic separation packing material bed is an ion exchange resin bed.

14. A method according to claim 1, wherein the chromatographic separation packing material bed is a weakly acid cation exchange resin bed.

15. A method according to claim 1, wherein the chromatographic separation packing material bed is a strongly acid cation exchange resin bed.

16. A method according to claim 1 wherein the number of columns or chromatographic separation packing material beds are from 1 to 28.

17. A method according to claim 1 wherein the number of steps is 1 to 50 during one cycle.

18. A method according to claim 1 wherein the linear flow rate of said solution through said columns in said loop is 0.4 to 20 m/h.

19. A method according to claim 1 wherein the solution to be processed comprises a liquid selected from the group consisting of: molasses, B-molasses, C-molasses, cane molasses, vinasse, fructose syrup, glucose syrup, beet-derived juices, invert sugar mixtures, stillage, starch hydrolysates, wood molasses, biomass molasses, wheat molasses, barley molasses, corn molasses, wood hydrolysates, milk whey solutions, lactose containing solution, lactulose-containing solutions, maltose-containing solutions, maltitol-containing solutions, solutions containing amino acids, fermentation broths containing at least one organic acid, fermentation broths containing citric acid, fermentation broths containing organic acid, fermentation broths containing gluconic acid, bagasse hydrolysates, and solutions containing at least one of the following constituents of sucrose, betaine, carbohydrates, sugar alcohols, ionic substances, monosaccharides, disaccharides, pentose, xylose, rhamnose, arabinose, mannose, raffinose, inositol, mannitol, sorbitol, xylitol, erythritol, glutamic acid, glycerol, tagatose, isomaltulose, or trehalulose solutions.

20. A method according to claim 19 wherein said wood molasses and said biomass molasses comprise xylan-derived material derived from vegetable material.

21. A method according to claim 20 wherein said xylan derived material derived from vegetable matter is selected from the group consisting of: wood, wood chips, saw dust, hardwood, birch, aspen, beech, eucalyptus, poplar, alder, elm, softwood, grain, corn, wheat, barley, rice, oat, particulates of grain, straw, stems, hulls, husks, fibers, corn husks, barley husks, oat husks, rice hulls, corn fiber, corn stems, corn cobs, bagasse, almond shells, coconut shells, cotton seed bran, and cotton seed hulls.

22. A method according to claim 19 wherein said biomass and wood molasses are obtained by acid hydrolysis or enzymatic hydrolysis of xylan.

23. A method according to claim 19 wherein said biomass molasses comprises biomass hydrolysates derived from biomass.

24. A method according to claim 23 wherein said biomass hydrolysates are obtained by a process selected from the group consisting of: direct acid hydrolysis of said biomass, enzymatic prehydrolysate of molasses obtained from steam exploded biomass or from by acetic acid or steam hydrolyzed biomass, acid hydrolysis of prehydrolyzate obtained from steam exploded biomass or from acetic acid or steam hydrolyzed biomass, and a sulphite pulping process.

25. A method according to claim 19 wherein said wood molasses and said wood hydrolysates are selected from the group consisting of: sulphite cooking liquor, spent sulphite pulping liquor, acid spent sulphite liquor, spent liquor from hardwood pulping, spent liquor from softwood pulping before hexoses are removed, spent liquor from softwood pulping after hexoses are removed, spent liquor from digestion of said biomass, spent liquor from hydrolysis of said biomass, spent liquor from solvent-based pulping, spent liquor from ethanol-based pulping, mother liquor from crystallization of xylose, diluted runoff of xylose crystallization from sulphite spent pulping liquor derived solution, waste solution from the paper industry, and waste solution from the pulping industry.

26. A method according to claim 19 wherein said molasses is derived from spent liquor obtained by ultrafiltration or from a side removal during sulphite cooking.

27. A method according to claim 19 wherein said molasses comprises a xylose solution.

28. A method according to claim 1 wherein the solution to be fractionated is a sulphite cooking spent liquor.

29. A method according to claim 1 wherein the solution to be fractionated is beet molasses.

30. A method according to claim 1 wherein at least one product fraction withdrawn from the loop, said product fraction comprising at least one product selected from a group consisting of: glucose, fructose, sucrose, betaine, rhamnose, lactose, lactulose, maltose, maltitol, arabinose, mannose, raffinose, inositol, mannitol, glycerol, xylitol, xylose, sorbitol, erythritol, organic acids, amino acids, and glutamic acid.

31. A method according to claim 1 wherein the cycle in the separation system comprises the following phases:
   a) said feeding phase wherein the feed solution is fed into one of the columns in one of the loops and optionally substantially simultaneously eluant is fed into the subsequent column, and a first product fraction and/or recycle fraction and a residue fraction are drawn and collected from the same or from the subsequent column;
   b) said circulation phase, wherein liquid present in the loop with its dry solids (DS) profile is circulated in the loop and simultaneously nothing is fed into or collected from the chromatographic separation loop;
   c) said eluting phase, wherein eluant is fed into a column and residue fraction and optionally a second product fraction are drawn and collected from the same or from a subsequent column.

32. A method claimed according to claim 1 wherein:
   the processing occurs in at least two chromatographic separation loops comprising at least a first loop and a second loop, each loop comprising an SMB system and being separate and distinct from another loop, and each loop comprising one or more chromatographic beds, columns, or parts thereof separate and distinct from the other loop; and
   a solution derived from one of the fractions drawn from the first loop is fractionated into at least two other fractions in the second loop.

33. A method claimed according to claim 1 wherein there are at least more than one dry solids (dry substance (DS)) profiles circulating simultaneously in the same loop during the circulation phase of each cycle.

34. A method claimed according to claim 1 wherein the cycle starts at a different column as the previous cycle.

35. A method claimed according to claim 1 wherein said phases can occur one or several times in different steps during each cycle.

36. A method according to claim 1 wherein said feed solution is selected from the group consisting of: raw juice, diffusion juice, thin juice, thick juice, dilute juice, residual juice, molasses-containing liquid, and molasses-containing juice.

37. A method according to claim 1 wherein said product comprises a product fraction comprising a sucrose fraction.

38. A method according to claim 1 wherein said product comprises a product fraction comprising a xylose fraction.

39. A method according to claim 1 wherein one of said fractions comprises a product fraction comprising a betaine fraction, and said betaine fraction comprises a greater percentage concentration of betaine by weight on a dry solids (dry substance) basis than at least one of said other fractions in or from said loops.

40. A method according to claim 1 wherein said dry solids (dry substance) (DS) profile is advanced during said processing.

41. A method according to claim 1 wherein said feed solution prior to feeding phase is subjected to at least one pretreatment process selected from the group consisting of: filtering, ultrafiltration, heating, concentrating, evaporation, neutralization, pH adjustment, volume adjustment, dilution, hydrogenation, softening by carbonation, and ion exchange.

42. A method according to claim 1 wherein the feed solution comprises a dry solids (DS) content of 20% to 80% by weight on a dry solids (DS) basis.

43. The method according to claim 1 wherein the number of columns or chromatographic separation packing material resin beds is from 2 to 12.

44. A method according to claim 1 wherein the linear flow is 1 to 12 m/h.

45. A method according to claim 1 wherein said feed solution comprises components providing constituents comprising low migration rate constituents, intermediate migration rate constituents, and high migration rate constituents.

46. A method according to claim 1 wherein:
   the solution comprises sulphite cooking liquor comprising xylose, arabinose, glucose, galactose, rhamnose, mannose, and xylonic acid; and
   at least one of the products comprises a xylose fraction having a greater percentage concentration by weight on a dry solids basis of xylose, arabinose, glucose, galactose, rhamnose, mannose, and xylonic acid, than in the feed solution.

47. A method according to claim 1 wherein:
   the solution comprises xylose, arabinose, glucose, galactose, rhamnose, and mannose; and
   at least one of the products comprises at greater percentage concentration by weight on a dry solids basis of xylose, arabinose, glucose, galactose, rhamnose, and mannose, than in the feed solution.

48. A method according to claim 1 wherein:
   the solution comprises sucrose and betaine;
   one of said fractions comprises a sucrose fraction having a greater percentage concentration by weight of sucrose on a dry solids basis than the sucrose in the feed solution; and
   another of said fractions comprises a betaine fraction having a greater percentage concentration by weight of betaine on a dry solids basis than the betaine in the feed solution.

49. A method according to claim 1 wherein:
the solution comprises a fructose syrup comprising fructose; and
the product comprises a fructose fraction comprising a greater percentage concentration of fructose by weight on a dry solids basis than the fructose in the feed solution.

50. A method according to claim 1 wherein:
the solution comprises a maltose syrup comprising maltose; and
the product comprises a maltose fraction comprising a greater percentage concentration of maltose by weight on a dry solids basis than the maltose in the feed solution.

51. A method for fractioning a solution into at least two fractions by a chromatographic simulated moving bed (SMB) process, comprising:
processing a solution in more than one cycle in at least one chromatographic separation loop in a chromatographic simulated moving bed (SMB) system having one or more columns containing chromatographic separation packing material resin beds providing a required short chromatographic separation resin bed;
said solution comprising a feed solution comprising one or more of the following selected from the group consisting of a feedstock, a recycle liquid comprising a recycle fraction, liquid from a previous chromatographic separation loop, liquid from a subsequent loop, and a solution derived from any of the preceding;
forming at least one separation profile comprising a dry solids (DS) profile from said processing of said solution, said separation profile being broad whereupon a length of chromatographic separation resin bed needed for the good separation result is short in said loop;
each cycle comprising a predetermined number of steps in a predetermined order, said steps comprising the following different phases selected from the group consisting of a feeding phase, a circulation phase, an eluting phase, and a recycling phase; at least some of the phases occurring sequentially, consecutively, simultaneously, concurrently, or continuously;
said feeding phase comprising feeding said solution into one of the columns and drawing and collecting a product, a residue comprising a residual fraction, or other fraction from the SMB system;
said eluting phase comprising feeding an eluant into one or more columns and drawing and collecting the product, the residue comprising the residual fraction and/or other fraction from the SMB system;
said recycling phase comprising recycling said recycle liquid comprising said recycle fraction to at least one of the columns;
said circulation phase comprising circulating said solution with said dry solid (DS) profile through said columns of said loop while substantially preventing and without feeding further solution to said columns during said circulation phase and while substantially preventing and without drawing and collecting said products or fractions from the columns or loops of the SMB system during said circulation phase; and
said dry solids (DS) profile being circulated with said solution less than once through said columns of said loop during said cycle so that the separation profile passes less than once through said chromatographic separation loop in said SMB system during each cycle using said steps and phases.

52. A method claimed according to claim 51 wherein at least some of said phases during said cycle occur sequentially, consecutively, simultaneously, concurrently, or continuously in the same or different loop.

53. A method claimed according to claim 51 wherein:
the processing occurs in at least two chromatographic separation loops comprising at least a first loop and a second loop, each loop comprising an SMB system and being separate and distinct from another loop, and each loop comprising one or more chromatographic beds, columns, or parts thereof separate and distinct from the other loop; and
a solution derived from one of the fractions drawn from the first loop is fractionated into at least two other fractions in the second loop.

54. A method claimed according to claim 53 wherein at least some of the loops are connected in series with each other.

55. A method claimed according to claim 53 wherein at least some of the loops are connected in parallel with each other.

56. A method claimed according to claim 53 wherein the simulated moving bed (SMB) process in at least one of the loops comprises a sequential SMB process.

57. A method claimed according to claim 53 wherein the simulated moving bed (SMB) process in at least one of the loops comprises a continuous SMB process.

58. A method claimed according to claim 51 wherein liquid derived from said feed solution with its dry solids (dry substance) profile is partially circulated in at least one loop during each cycle for no more than a fraction selected from the group consisting of: (a) 0.5 circulations about the loop; (b) 0.7 circulations about the loop; or (c) 0.75 circulations about the loop.

59. A method claimed according to claim 51 wherein the separation profile essentially fills packing material column(s) in said chromatographic separation loop.

60. A method claimed according to claim 51 wherein there are at least more than one dry solids (dry substance (DS)) profiles circulating simultaneously in the same loop during the circulation phase of each cycle.

61. A method claimed according to claim 51 wherein the cycle starts at a different column as the previous cycle.

62. A method claimed according to claim 51 wherein said phases can occur one or several times in different steps during each cycle.

63. A method according to claim 51 wherein the number of columns or chromatographic separation packing material beds are from 1 to 28.

64. A method according to claim 51 wherein the number of columns or chromatographic separation packing material beds are from 2 to 12.

65. A method according to claim 51 wherein the number of columns or chromatographic separation packing material beds are from 1 to 6.

* * * * *